US 6,558,614 B1

(12) United States Patent
Fritz

(10) Patent No.: US 6,558,614 B1
(45) Date of Patent: May 6, 2003

(54) METHOD FOR PRODUCING A METAL MELT AND CORRESPONDING MULTIFUNCTION LANCE

(75) Inventor: Ernst Fritz, Linz (AT)

(73) Assignee: Voest-Alpine Industrieanlagenbau GmbH (AT)

( * ) Notice: Subject to any disclaimer, the term of this patent is extended or adjusted under 35 U.S.C. 154(b) by 0 days.

(21) Appl. No.: 09/763,821

(22) PCT Filed: Feb. 22, 1999

(86) PCT No.: PCT/AT99/00045

§ 371 (c)(1),
(2), (4) Date: May 1, 2001

(87) PCT Pub. No.: WO00/12767

PCT Pub. Date: Mar. 9, 2000

(30) Foreign Application Priority Data

Aug. 28, 1998 (AU) .......................................... A 1474/98
Feb. 15, 1999 (AU) ............................................ A 217/99

(51) Int. Cl.⁷ ................................................ C21C 5/32
(52) U.S. Cl. ........................ 266/44; 266/225; 266/270
(58) Field of Search ............................... 266/225, 268, 266/270, 44

(56) References Cited

U.S. PATENT DOCUMENTS

| 3,889,933 | A | 6/1975 | Jaquay .......................... 266/34 |
| 5,377,960 | A | 1/1995 | Leczo et al. .................. 266/225 |
| 5,599,375 | A | 2/1997 | Gitman ....................... 75/10.42 |

FOREIGN PATENT DOCUMENTS

| AU | 402963 | 10/1997 | | |
| CH | 429002 | 7/1967 | | |
| DE | 4439122 | 8/1995 | | |
| DE | 4442362 | 4/1996 | | |
| EP | 0140541 | 5/1985 | | |
| EP | 0257450 | 3/1988 | | |
| GB | 977217 | 12/1964 | | |
| GB | 1015581 | 1/1966 | | |
| GB | 2150269 | 6/1985 | | |
| JP | 61-236625 | 10/1986 | | |
| JP | 406025732 A | * 2/1994 | .................. | 266/47 |
| JP | 6-081023 | 3/1994 | | |
| JP | 408157929 A | * 6/1996 | .................. | 266/225 |
| WO | 91/00366 | 1/1991 | | |
| WO | 97/09566 | 3/1997 | | |

* cited by examiner

Primary Examiner—Scott Kastler
(74) Attorney, Agent, or Firm—Ostrolenk, Faber, Gerb & Soffen, LLP

(57) ABSTRACT

The invention relates to a method for producing a metal melt in a metallurgical vessel, in particular an iron or steel melt, feed substances which contain metals and/or metal oxides, being charged in solid and, if appropriate, molten form into the metallurgical vessel, the main part of the energy necessary for the melting and, if appropriate, finish-reduction of the feed substances being applied electrically and/or by the combustion and/or gasification of carbon-containing materials. The invention relates, further, to multi-functional lances for use in a method according to the invention.

47 Claims, 9 Drawing Sheets

METHOD FOR PRODUCING A METAL MELT AND CORRESPONDING MULTIFUNCTION LANCE

The invention relates to a method for producing a metal melt in a metallurgical vessel, in particular an iron or steel melt, feed substances, which contain metals and/or metal oxides, being charged in solid and, if appropriate, molten form into the metallurgical vessel, the main part of the energy necessary for the melting and, if appropriate, finish-reduction of the feed substances being applied electrically and/or by the combustion and/or gasification of carbon-containing materials. The invention relates, further, to a multi-functional lance for use in a method according to the invention.

EP 0 257 450 A2 teaches a method for increased energy introduction and current saving in arc furnaces for steelmaking. In this case, free oxygen jets emanating from blow-on devices are used for the post-combustion of the furnace waste gases and under-bath nozzles are used for moving the bath. Coal for the formation of CO is blown in via a hollow electrode or under-bath nozzles and the oxygen for the formation of CO is likewise supplied to the melt through under-bath nozzles.

A disadvantage, here, is the high outlay in terms of apparatus for blowing in the coal, the formation of CO and post-combustion. Furthermore, the under-bath nozzles required, which are loaded with oxygen, are exposed to high wear and, correspondingly, have only a short service life.

There have also been many attempts to make devices and methods available for heating and blowing for metallurgical purposes and for combustion in metallurgical reactors.

Thus GB 1,015,581 discloses a burner with a central oxygen duct, with a fuel supply duct surrounding the latter and with an outer annular duct for oxygen. The fuel and oxygen are intermixed immediately after emerging from the respective mouths. According to GB 1,015,581, the burner is provided for use in all top-blowing oxygen steelmaking methods.

However, such a burner is unsuitable for sucking in furnace gases to an appreciable extent for post-combustion, so that it can contribute nothing or only little to improving the energy balance.

AT 402,963 B describes the combustion of fuel by means of a specially designed burner. As a result of the rapid intensive swirling of the fuel together with oxygen in a chamber of the burner, the outflowing mixture very soon becomes relatively slow over the running distance of the mixture jet. Such a burner therefore has relatively short flame length and in this case, once again, neglects to suck in furnace gases, so that this, too, can contribute little to improving the energy balance. Furthermore, such a burner is suitable only to a limited extent for the refining of a steel melt.

WO 91/00366 describes a method and a device for heating a metallurgical furnace, an inner oxygen duct being encased annularly by a fuel duct. In this case, the fuel is supplied by means of an inert to weakly reducing carrier gas. Here too, no possibility is given for the post-combustion of furnace waste gases by sucking them into the burner jet or for the refining of the melt.

The object of the present invention is, therefore, to provide a method and a device for use in such a method which avoid the disadvantages known from the prior art. In particular, a method is to be provided, which requires less energy, both electric and fossil, than known methods in order to produce a metal melt and which can be carried out in a shorter time, and multi-functional lances are to be provided, by means of which the method according to the invention can be carried out and which, furthermore, are kept compact and simple in terms of construction and, when a repair is necessary, can be repaired again easily and simply.

This object is achieved, according to the invention, by means of the combination of the following features: that A) in a combustion step, additional energy is supplied to the feed substances by the blowing-in, taking place by means of one or more multi-functional lances, and combustion of gaseous and/or liquid carbon-containing materials and oxygen-containing gas, B) in a cutting and melting step, the solid feed substances are cut and partially melted by the intensified blowing-in, taking place by means of the multi-functional lance or lances, of oxygen-containing gas, C) in a refining step, the melted feed substances are refined by the intensified blowing-in, taking place by means of the multi-functional lance or lances, of oxygen-containing gas, D) in a carbon blow-in step, alloying carbon and/or additional energy is supplied to the feed substances by the blowing-in, taking place by means of the multi-functional lance or lances, and, if appropriate, combustion of fine-grained and/or dust-like solid carbon-containing materials, E) in a post-combustion step, the waste gases from the metallurgical vessel are afterburnt by the blowing-in, taking place by means of the multi-functional lance or lances and directed away from the respective multi-functional lance in at least two of the three spatial directions, of oxygen-containing gas into the waste-gas space of the metallurgical vessel, F) in a solid blow-in step, the necessary substances are supplied to the feed substances by the blowing-in, taking place by means of the multi-functional lance or lances, of fine-grained and/or dust-like solid aggregates and/or alloying agents, in order to achieve the desired composition of the metal melt, steps A) to F) being carried out, depending on the composition of the feed substances and on the desired composition of the metal melt, selectively in any desired combination, in particular in succession and/or in reverse order and/or simultaneously and/or omitting individual steps of steps A) to F).

By means of the method according to the invention, metal melts can, according to an advantageous feature, be produced, for example, in electric furnaces or converters or melt-down gasifiers or in a particularly energy-saving and time-saving way. Furthermore, ladles or vessels for the conversion of slag may be used as metallurgical vessels. The respective metallurgical vessel may be under overpressure, atmospheric pressure, underpressure or a vacuum.

The multi-functional lances used for the method according to the invention make it possible to carry out the individual method steps flexibly, with free choice and, in particular, also simultaneously.

There is an increase in the use of solid metal carriers for producing melts, in particular steel melts, since these materials are already metallic and therefore no longer have to be reduced at a high outlay. Such solid metal carriers are therefore recirculated to an increasing extent. In particular, such materials, such as scrap, pig iron, cast iron, etc., are processed in electric furnaces, so that it is particularly important to improve the operation of electric furnaces. Rapid melting-down and refining in order to set short furnace cycle times are important for achieving low heat losses and electrode consumptions and for the uninterrupted feeding of modern continuous casting plants. Moreover, the melting capacity of electric furnaces is also to be increased as a result of the controlled parallel introduction of electric and fossil energy.

These requirements are satisfied by the method according to the invention.

According to an advantageous feature of the method according to the invention, one or more multi-functional lances are used jointly with burners and/or refining lances and/or post-combustion lances and/or, in the case of electric furnaces, under-bath nozzles and/or hollow electrodes and/or, in the case of converters, side nozzles, which in each case are known per se.

It is thereby possible that burners and/or refining lances and/or post-combustion lances cover, as it were, the basic loads of a corresponding method step and, in addition, energy is introduced, melting carried out, refining carried out, coal and/or alloying agent blown in, waste gas afterburnt, etc., at particularly important points by means of the multi-functional lance or lances additionally used, for the purpose of achieving a rapid method flow.

In a further advantageous embodiment of the method according to the invention, in a solid blow-in step, one or more of the following substances is or are blown into or onto the partially or completely melted feed substances: metal ores, such as chrome ore, nickel ore and manganese ore, metal oxides, such as nickel oxide, vanadium oxide and chrome oxide, iron carbide, calcium carbide, aluminium, FeSi, FeCr, FeMn, oil-containing scale, slags, slag formers, dusts from dedusting systems, grinding dusts, metal chips, deoxidants, shredderlight fraction, lime, coal, coke and sponge iron, in each case in fine-grained and/or dust-like form.

If a plurality of substances are to be blown in, these may be blown, intermixed or separately, into/onto the partially or completely melted feed substances. The introduction of a mixture of substances may, for example, then be somewhat advantageous when metal ores and/or metal oxides are blown in jointly with deoxidants.

Preferably, in a post-combustion step, the blowing-in of oxygen-containing gas takes place in a periodically fluctuating and/or pulsating manner.

As a result, the post-combustion of the waste gases from the metallurgical vessel can be carried out particularly efficiently, so that the energy released at the same time is transmitted with high efficiency to the feed substances and is not lost to the waste-gas system which is even relieved of thermal load.

According to a further embodiment of the method according to the invention, in a carbon blow-in step and/or a solid blow-in step in an electric furnace, the jet from a multi-functional lance is directed into the vicinity of the point of impingement or into the point of impingement of solid material, which is charged onto the melt via an orifice in the furnace roof, or of an arc on the melt.

According to an equally advantageous embodiment, in a carbon blow-in step and/or a solid blow-in step in a converter, the jet from a multi-functional lance is directed into the vicinity of the point of impingement or into the point of impingement of an oxygen jet from a further lance or a side nozzle on the melt.

The two last-mentioned embodiments are advantageous particularly when large quantities of ores, NiO, oxidic fines and dusts, which in each case may also be mixed with coal, have to be reduced. The reduction and melting of the feed substances are particularly accelerated by the introduction of carbon at the point or points where the greatest supply of energy also simultaneously takes place.

According to a particularly advantageous feature of the method according to the invention, one or more of the method steps A, B, D, E and F are carried out by means of a multi-functional lance essentially simultaneously with a refining step, particular preference being given to carrying out a combustion step essentially simultaneously with a refining step. By "essentially simultaneously" is meant, here, an at least partial time overlap of the two method steps.

In addition to the intensified blowing-in of oxygen-containing gas, as a result of which the melted feed substances are refined, liquid and/or gaseous carbon-containing substances and oxygen-containing gas are also blown in and the carbon-containing substances are burnt.

According to a further advantageous feature of the method according to the invention, in a refining step during the production of preferably alloyed iron melts with a low carbon content, steam and/or an inert gas, such as nitrogen, and/or rare gases are blown into or onto the partially or already completely melted feed substances, in addition to the intensified blowing-in of oxygen-containing gas.

Consequently, the CO partial pressure and therefore iron slagging, as well as the slagging of alloying elements, in particular, chrome slagging, are reduced appreciably.

According to one embodiment of the method according to the invention, in a carbon blow-in step for the production of iron melts or steel melts with a low carbon content, the carbon-containing materials are blown at low velocity only onto and into the slag located above the melt.

Additional refining of the melt is thereby avoided here. The carbon-containing materials then serve primarily for the foaming of the slag.

As a result of a further advantageous embodiment of the method according to the invention, a liquid blow-in step (G) is carried out during one or more of the method steps A, B, C, and E, burnable and/or unburnable, possibly toxic liquids which are otherwise difficult to dispose of, for example halogenated carbons or oils, being blown in by means of the multi-functional lance or lances, thermally decomposed and thereby disposed of in an environmentally friendly manner.

By liquids are also meant, in this respect, solutions of disposable solids in corresponding solvents.

Preferably, the liquid blow-in step takes place onto the hottest point in the metallurgical vessel, and, consequently, it is particularly preferred to carry out the liquid blow-in step during a refining step or to direct the liquid jet onto the point of impingement of an arc on the melt.

In conjunction with an appropriate aftertreatment of the waste gas from the metallurgical vessel, such as, for example, quenching, the blowing-in of activated charcoal, etc., it is possible for liquids which are difficult to dispose of to be disposed of not only in an environmentally compatible way, but also profitably.

According to a further embodiment of the method according to the invention, during a refining step (C) the blown-in jet of the oxygen-containing gas is influenced in a controlled manner by the blowing-in, taking place by means of the multi-functional lance, of a further gas jet.

The subject of the invention is also a multi-functional lance for use in the method according to the invention, having a plurality of tubes which surround one another and are concentric to a central longitudinal axis and a common end of which forms the head of the multi-functional lance.

The solution for achieving the object set according to the invention depends, inter alia, on whether the multi-functional lance is to be suitable for blowing in large or small solid quantities.

For blowing in small solid quantities, the object set according to the invention is achieved by means of the combination of the following features:

a first tube (1) for forming a supply duct, in particular for solid, fine-grained to dust-like substances, a second tube (3) surrounding the first tube (1) so as to form a first annular gap (4), in particular for the supply of an oxygen-containing gas, the mouth part (6) of the second tube (3) being designed as a Laval nozzle, a third tube (7) surrounding the second tube (3) so as to form a second annular gap (8), in particular for the supply of gaseous and/or liquid fuel, a fourth tube (9) surrounding the third tube (7) so as to form a third annular gap (10), in particular for the supply of an oxygen-containing gas, a fifth tube (11) surrounding the fourth tube (9) so as to form a fourth annular gap (12), in particular for the supply of an oxygen-containing gas, the fourth annular gap (12) terminating, on the mouth side, so as to form a plurality of outflow ducts (13), and the direction of flow being directed through each outflow duct (13) away from the central longitudinal axis (2).

Particularly advantageous, here, is the first tube, through which predominantly fine-grained and/or dust-like solids are blown into and/or onto the melt or slag. Depending on the method step, in a carbon blow-in step, a supply of carbon-containing materials, in particular coal, but, for example, also coke and/or shredderlight fraction, is carried out, and, in a solid blow-in step, a supply of aggregates and/or alloying agents is carried out, by aggregates and alloying agents being meant all conventional slag formers, slag-foaming agents, agents for the oxidation of undesirable accompanying elements, agent for setting the desired composition of the metal melt, etc., which are normally used in the production of metal melts, in particular of steel and pig-iron melts. The first tube makes it possible for the multi-functional lance according to the invention to perform the carbon and solid blow-in functions.

Solids of an order of magnitude of up to 10 kg/min can be blown in by means of the multi-functional lance characterized by the above feature combination.

Since the mouth part of the second tube is designed as a Laval nozzle, the admission pressure of the oxygen-containing gas supplied during cutting and melting steps and during refining steps can be converted into a pulse, that is to say velocity. The first annular gap formed by the first and second tubes makes it possible for the multi-functional lance according to the invention to perform the cutting, melting and refining functions.

By oxygen-containing gas is preferably meant industrial oxygen, such as is obtained, for example, from an air separation plant, or air or air enriched with oxygen.

The second and third annular gaps serve, in a combustion step, for the supply of gaseous and/or liquid fuel, for example natural gas and/or fuel oil, or for the supply of oxygen-containing gas, in particular industrial oxygen, by means of which the fuel is burnt. The second and third annular gaps together make it possible for the multi-functional lance according to the invention to perform the burner function for a combustion step.

The fourth annular gap formed by the fourth and fifth tubes serves, in a post-combustion step, for the supply of oxygen-containing gas and thus makes it possible for the multi-functional lance according to the invention to perform the post-combustion function.

According to a preferred embodiment, the fourth annular gap terminates, on the mouth side, so as to form 2 to 16, preferably 4 to 6 outflow ducts.

The outflow ducts are directed away from the central longitudinal axis preferably in such a way that the normal projection of the centre axis of each outflow duct onto a plane drawn through the central longitudinal axis and through the mouth of the outflow duct forms with the central longitudinal axis an angle $\alpha$ of 2.5 to 25°, preferably an angle $\alpha$ of 5 to 15°.

By virtue of this design of the outflow ducts, by means of the oxygen-containing gas, which is fed to the atmosphere of the metallurgical vessel through the outflow ducts, a wide region of this atmosphere can be covered and burnable waste gases can be afterburnt.

According to an advantageous feature, the centre axes of the outflow ducts are skew to the central longitudinal axis of the multi-functional lance, specifically in such a way that the normal projection of the centre axis of each outflow duct onto a plane directed normally to the central longitudinal axis forms, with a plane drawn through the central longitudinal axis and through the mouth of the outflow duct, an angle $\beta$ of 2.5 to 60°, preferably an angle $\beta$ of 5 to 200.

This design of the outflow ducts allows an even more comprehensive post-combustion of waste gases from the metallurgical vessel, since, as a result, the oxygen-containing gas blown in via the outflow ducts and, consequently, also the waste gases from the metallurgical vessel, which are sucked into these oxygen gas jets, are set in helical rotational movement. This assists the intermixing of the oxygen-containing gas with the waste gases and the post-combustion of these.

The individual angles $\alpha$ and $\beta$ may also be selected differently in each case for individual outflow ducts, in order to take optimally into account special boundary conditions when the multi-functional lance is used.

The outermost, that is to say fifth tube is advantageously provided with cooling which is preferably designed as a water-cooled double casing.

By means of the cooling provided according to this feature, the lifetime of the multi-functional lance is prolonged.

According to a further advantageous feature, the mouth parts of the second and/or of the third tube have slots on the outside, these slots preferably being arranged parallel to the central longitudinal axis. These slots serve for the improved cooling of the respective mouth part.

According to an advantageous design variant, the mouth parts of the first, of the second and of the third tube terminate in a first mouth plane normal to the central longitudinal axis and the mouth parts of the fourth and fifth tubes terminate in a second mouth plane normal to the central longitudinal axis, the first mouth plane being set back behind the second.

In this case, the water-cooled double casing is also expediently drawn forwards as far as the second mouth plane.

The tubes arranged inside the multi-functional lance are thereby better protected against mechanical stress at their mouth.

So that repair work can be carried out quickly and simply, the mouth end of the second tube is formed by a mouth part releasably connected, in particular screwably connected, to the second tube.

According to advantageous embodiments, the first and, if appropriate, the second tube are designed to be wear-resistant.

The wear-resistant design of the first and, if appropriate, the second tube is preferably such that the first and, if appropriate, the second tube are manufactured from an alloyed steel with chromium carbides or from a hard-chrome-plated steel or from hard-chrome-plated copper or from copper or a steel which is provided with a ceramic insert or covering on the inside and, if appropriate, on the outside.

These wear-resistant designs make it possible to blow abrasive media, such as, for example, fine-grained coal, metal oxides, slag formers and the like, through the first tube and, if appropriate, through the annular gap formed by the first and second tubes into or onto the melt or slag by means of a carrier gas, without thereby appreciably shortening the lifetimes of the first and second tubes.

So that, furthermore, repairs can be carried out particularly quickly and simply, advantageously the third and fourth tubes are divided in their length and the respective tube parts are fastened to one another by means of releasable connections, in particular screw connections.

According to a further advantageous embodiment, in addition to the mouth of the second tube, the mouth or mouths of the first and/or the third and/or the fourth tube and/or the outflow ducts are also designed as Laval nozzles.

This is expedient, in particular, in order, in addition to the refining and cutting function, also to obtain a high velocity and, consequently, pulse and range or depth of penetration of the respective gas and/or gas/solid jets for one or more of the functions, namely burner, carbon and solid blow-in and post-combustion.

The Laval nozzle form of the mouth of the second tube is expediently designed in such a way that the aperture angle $\gamma$ of the conical part of the mouth of the second tube is 0.1 to 5°, preferably 0.5 to 3°.

The choice of the aperture angle $\gamma$ also depends, inter alia, on the conditions prevailing in the melting vessel. Thus, if the melting vessel is under overpressure, somewhat lower values are selected for $\gamma$, whereas, in the case of a melting vessel in which underpressure or a vacuum prevails, higher values are advantageous.

As a result of a further advantageous embodiment, the first tube can be moved within the second tube along the central longitudinal axis, so that further influence can be exerted on the solid and carbon blow-in function. Furthermore, when the first tube is moved behind the contraction of the second tube, an increase in the oxygen quantity to be blown, in the case of a given admission pressure, can consequently be achieved.

In order to supply the multi-functional lance with carrier gas, the first tube as well as the first, the second, the third and the fourth annular gap are in each case connected to a carrier-gas supply, in particular an inert-gas supply.

Depending on the method step currently being carried out, carrier gas or inert gas can serve as injector gas for carbon or solid injection or for setting a specific oxygen content of the oxygen-containing gas supplied during a cutting and melting, refining or combustion step. Furthermore, the multi-functional lance, before being used in the method according to the invention, or the blowing cross sections not used at that particular time, can be scavenged with a small stream of inert gas and kept free of splashes of metal.

In order to supply the multi-functional lance with all the other gases necessary for the method steps, the first tube as well as the first, the third and the fourth annular gap are in each case connected to an oxygen supply, an air supply, if appropriate a steam supply and connectable and disconnectable solid injection and the second annular gap is connected to a fuel supply for the supply of liquid and/or gaseous fuel.

So that, if appropriate, oxygen can also be blown through the first tube, which otherwise serves predominantly for blowing coal and solids, in a cutting and melting and/or refining step, a change-over from the carrier-gas and solid supply of the first tube to the supply of oxygen can be made by means of a change-over device, in particular a change-over valve.

Advantageously, the supply of gases to the multi-functional lance can be regulated by setting the admission pressure of the respective gas.

Alternatively or additionally to this, the supply of gases to the multi-functional lance can be set by means of simple rigid diaphragms and/or quick-acting stop valves which in each case are arranged in the individual gas lines.

The object set according to the invention is achieved, furthermore, for the blowing-in of large solid quantities, by means of the combination of the following features:

a first tube for forming a supply duct, in particular for liquids or oxygen-containing gas, a second tube surrounding the first tube so as to form a first annular gap, in particular for the supply of an oxygen-containing gas, the mouth part of the second tube being designed as a Laval nozzle, a third tube surrounding the second tube so as to form a second annular gap, in particular for the supply of gaseous and/or liquid fuel, a fourth tube surrounding the third tube so as to form a third annular gap, in particular for the supply of an oxygen-containing gas, a fifth tube surrounding the fourth tube so as to form a fourth annular gap, in particular for the supply of cooling water, the fourth annular gap being designed to be closed on the mouth side, a sixth tube surrounding the fifth tube so as to form a fifth annular gap, in particular for the supply of oxygen-containing gas, the fifth annular gap terminating, on the mouth side, so as to form a plurality of outflow ducts, and the direction of flow being directed through each outflow duct away from the central longitudinal axis, a seventh tube surrounding the sixth tube so as to form a sixth annular gap, in particular for drawing off cooling water, the sixth annular gap being designed to be closed on the mouth side, and the fourth annular gap being connected to the sixth annular gap, in the region of the head of the multi-functional lance, by means of bores which do not cross the outflow ducts, one to nine nozzle tubes of wear-resistant design, in particular for the supply of solid, fine-grained to dust-like substances, the nozzle tubes being arranged within the fifth annular gap and the centre axis of each nozzle tube being arranged parallel to the longitudinal axis, and the nozzle tubes piercing the head of the multi-functional lance, without crossing bores or outflow ducts.

Particularly advantageous, here, are the nozzle tubes, through which fine-grained and/or dust-like solids are blown into and/or onto the melt or slag. Depending on the method step, in a carbon blow-in step, a supply of carbon-containing materials, in particular coal, but, for example, also coke and/or shredderlight fraction, is carried out, and, in a solid blow-in step, a supply of aggregates and/or alloying agents is carried out, by aggregates and alloying agents being meant all conventional slag formers, slag-foaming agent, agent for the oxidization of undesirable accompanying elements, agent for setting the desired composition of the metal melt, etc., which are normally used in the production of metal melts, in particular of steel and pig-iron melts. The nozzle tubes make it possible for the multi-functional lance according to the invention to perform the carbon and solid blow-in functions.

The multi-functional lance characterized by the above feature combination is pre-eminently suitable for also blowing in very large solid quantities of up to 200 kg/min. This is particularly advantageous when relatively large fractions of electrical energy, which were hitherto necessary for producing the melt, are to be replaced by fossil energy, in order, for example, to increase productivity further or when relatively large quantities of the abovementioned solids are to be blown pneumatically into the slag and/or melt for a wide variety of instances of use.

Since the mouth part of the second tube is designed as a Laval nozzle, the admission pressure of the oxygen-containing gas supplied during cutting and melting steps and during refining steps can be converted into a pulse, that is to say velocity. The first annular gap formed by the first and second tubes makes it possible for the multi-functional lance according to the invention to perform the cutting, melting and refining functions.

By oxygen-containing gas is preferably meant industrial oxygen, such as is obtained, for example from an air separation plant, or air or air enriched with oxygen.

The first tube serves for the reproducible control of the pulse of the Laval jet out of the first annular gap, in that the jet propagation and, consequently, also the refining effect of the Laval jet are regulated by means of the first tube. This is also employed in order not to subject the refractory bottom of the metallurgical vessel to additional wear in the case of a low bath height or in order to ensure, in a controlled manner, higher FeO contents in slags above steel melts, so as thereby to improve appreciably the dephosphorization of the metal melts, even when the carbon contents of the melt are relatively high. The multi-functional lance according to the invention therefore also has the capability of controlling the iron oxide contents of the slags and, consequently, the dephosphorization, but, for example, also the devanadization, of the iron melt.

Liquids to be disposed of can also be injected through the first tube into the Laval jet or the focal spot in front of the multi-functional lance. The first tube thus makes it possible, inter alia, for the multi-functional lance according to the invention to perform the liquid blow-in function.

Normally, however, the first tube is loaded with oxygen or oxygen-containing gas. During the refining of alloyed melts, the first tube can be loaded with air or inert gas or steam, in order to lower the CO partial pressure at the focal spot in front of the multi-functional lance and, consequently, reduce chromium slagging.

In a combustion step, the second and third annular gaps serve for the supply of gaseous and/or liquid fuel, for example natural gas and/or fuel oil, or for the supply of oxygen-containing gas, in particular industrial oxygen, by means of which the fuel is burnt. The second and third annular gaps together make it possible for the multi-functional lance according to the invention to perform the burner function for a combustion step.

The fifth annular gap formed by the fifth and sixth tubes serves, in a post-combustion step, for the supply of oxygen-containing gas and thus makes it possible for the multi-functional lance according to the invention to perform the post-combustion function.

The lifetime of the multi-functional lance is prolonged by means of the cooling casing formed by the fourth and sixth annular gaps and by the bores connecting these annular gaps and located in the head of the multi-functional lance.

According to a preferred embodiment, the fifth annular gap terminates, on the mouth side, so as to form 2 to 16, preferably 4 outflow ducts.

The outflow ducts are directed away from the central longitudinal axis preferably in such a way that the normal projection of the centre axis of each outflow duct onto a plane drawn through the central longitudinal axis and through the mouth of the outflow duct forms with the central longitudinal axis an angle $\alpha$ of 2.5 to 25°, preferably an angle $\alpha$ of 5 to 15°.

By virtue of this design of the outflow ducts, by means of the oxygen-containing gas, which is fed to the atmosphere of the metallurgical vessel through the outflow ducts, a wide region of this atmosphere can be covered and burnable waste gases can be afterburnt.

According to an advantageous feature, the centre axes of the outflow ducts are skew to the central longitudinal axis of the multi-functional lance, specifically in such a way that the normal projection of the centre axis of each outflow duct onto a plane directed normally to the central longitudinal axis forms, with a plane drawn through the central longitudinal axis and through the mouth of the outflow duct, an angle $\beta$ of 2.5 to 60°, preferably an angle $\beta$ of 5 to 20°.

This design of the outflow ducts allows an even more comprehensive post-combustion of waste gases from the metallurgical vessel, since, as a result, the oxygen-containing gas blown in via the outflow ducts and, consequently, also the waste gases from the metallurgical vessel, which are sucked into these oxygen gas jets, are set in a helical rotational movement. This assists the intermixing of the oxygen-containing gas with the waste gases and the post-combustion of these.

The individual angles $\alpha$ and $\beta$ may also be selected differently in each case for individual outflow ducts, in order to take optimally into account special boundary conditions when the multi-functional lance is used.

The Laval nozzle form of the mouth of the second tube is expediently designed in such a way that the aperture angle $\gamma$ of the conical part of the mouth of the second tube is 0.1 to 5°, preferably 0.5 to 3°.

The choice of the aperture angle $\gamma$ also depends, inter alia, on the conditions prevailing in the melting vessel. Thus, if the melting vessel is under overpressure, somewhat lower values are selected for $\gamma$, whereas, in the case of a melting vessel in which underpressure or a vacuum prevails, higher values are advantageous.

According to a further advantageous feature, the mouth parts of the second and/or of the third tube have slots on the outside, these slots preferably being arranged parallel to the central longitudinal axis. These slots serve for the improved cooling of the respective mouth part.

According to an advantageous design variant, the mouth parts of the second and of the third tube terminate in a first mouth plane normal to the central longitudinal axis and the mouth parts of the fourth, fifth, sixth and seventh tube terminate in a second mouth plane normal to the central longitudinal axis, the first mouth plane being set back behind the second.

The tubes arranged inside the multi-functional lance are thereby better protected against mechanical stress at their mouth.

As a result of a further advantageous embodiment, the first tube can be moved within the second tube along the central longitudinal axis, so that further influence can be exerted on the Laval jet from the first annular gap. Furthermore, when the first tube is moved behind the contraction of the second tube, an increase in the oxygen quantity to be blown, in the case of a given admission pressure, can consequently be achieved.

So that repairs can be carried out quickly and simply, the mouth end of the second tube is formed by a mouth part releasably connected to the second tube, in particular connected to it screwably or by means of a sliding connection sealed off by means of O-rings.

So that, furthermore, repairs can be carried out particularly quickly and simply, advantageously the third and/or the fourth and/or the fifth and/or the sixth and/or the seventh tube are divided at least once in their length and the respective tube parts are fastened to one another by means of releasable connections, in particular screw connections and/or sliding connections sealed off by means of O-rings.

According to a further advantageous embodiment, in addition to the mouth of the second tube, the mouth or mouths of the third and/or of the fourth tube and/or the outflow ducts and/or the mouth or mouths of the nozzle tube or nozzle tubes are also designed as Laval nozzles and/or the mouth of the first tube is widened in diameter.

This Laval nozzle form is expedient, in particular, in order, in addition to the refining and cutting function, also to obtain a high velocity and, consequently, pulse and range or depth of penetration of the respective gas and/or gas/solid jets for one or more of the functions, namely burner, carbon and solid blow-in and post-combustion.

The widening of the mouth diameter of the first tube is advantageous, in particular, in the case of a melting vessel which is under underpressure or a vacuum.

According to an advantageous embodiment, the nozzle tube or nozzle tubes is or are designed to be wear-resistant.

The wear-resistant design of the nozzle tubes is preferably such that the respective tube is manufactured from an alloyed steel with chromium carbides or from a hard-chrome-plated steel or from hard-chrome-plated copper or from copper or a steel which is provided with a ceramic insert or covering on the inside and, if appropriate, on the outside.

These wear-resistant designs make it possible to blow abrasive media, such as, for example, fine-grained coal, metal oxides, slag formers and the like, through the nozzle tubes into or onto the melt or slag by means of a carrier gas, without thereby appreciably shortening the lifetimes of the nozzle tubes.

In a further advantageous embodiment of the multi-functional lance according to the invention, a solid-distribution chamber is assigned to the nozzle tube or nozzle tubes at that end which faces away from the head of the multi-functional lance, the solid-distribution chamber being formed by an annular, essentially cylindrical hollow body enclosed all-round and having a bottom, a cover and a lateral limitation, and the nozzle tube or nozzle tubes piercing the bottom of the solid-distribution chamber from below, and at least one solid supply opening tangentially into the lateral limitation of the solid-distribution chamber.

In addition to the above embodiment, a further annular, essentially cylindrical hollow body is preferably provided, the further hollow body being open at the top and having a bottom and a lateral limitation, and the further hollow body being arranged within the solid-distribution chamber in such a way that a gap remains between the cover of the solid-distribution chamber and the lateral limitation of the further hollow body, and the nozzle tube or nozzle tubes opening into the bottom of the further hollow body.

Solid is blown tangentially into the solid-distribution chamber and f lows through the gap via an intermediate wall, formed by the lateral limitation of the further hollow body, into a space, from which the nozzle tubes lead away (that is to say, into the further hollow body). The entry to the nozzle tubes is conical and, like the nozzle tubes themselves, is designed to be wear-resistant.

The solid-distribution chamber is fastened to the lance body by means of a quick-acting fastening or a flange and, after the fastening has been released, can be drawn off. The wear-resistant nozzle tubes are fastened in a ring forming the bottom of the solid-distribution chamber and can easily be exchanged.

The solid-distribution chamber of the multi-functional lance according to the invention is expediently connected to a carrier-gas supply, in particular an inert-gas supply, and to one or more solid supplies.

Alternatively to this, that is to say when no solid-distribution chamber is provided, the nozzle tubes themselves are connected to a carrier-gas supply, in particular an inert-gas supply, and to one or more solid supplies.

For the further supply of the multi-functional lance with carrier gas, the first tube as well as the first, the second, the third and the fifth annular gap are in each case connected to a carrier-gas supply, in particular an inert-gas supply.

Depending on the method step currently being carried out, carrier gas or inert gas may serve as injector gas for carbon or solid injection or for setting a specific oxygen content of the oxygen-containing gas supplied during a cutting and melting, refining or combustion step. Furthermore, the multi-functional lance, before being used in the method according to the invention, or the blowing cross sections not used at that particular time, can be scavenged with a small stream of inert gas or with air and be kept free of splashes of metal.

In order to supply the multi-functional lance with all the other gases necessary for the method steps, the first tube as well as the first, the third and the fifth annular gap are in each case connected to an oxygen supply, an air supply and, if appropriate, a steam supply, and the second annular gap is connected to a fuel supply for the supply of liquid and/or gaseous fuel.

Additionally or alternatively to the supply of oxygen and/or air, the first and/or the fifth annular gap may be provided with a hot-blast supply. By hot blast is to be meant, in this case, an oxygen-containing gas, for example air enriched with oxygen, at a temperature of 200 to about 1200° C.

Advantageously, the supply of gases to the multi-functional lance can be regulated by setting the admission pressure of the respective gas.

Alternatively or additionally to this, the supply of gases to the multi-functional lance can be set by means of simple rigid diaphragms and/or quick-acting stop valves which in each case are arranged in the individual gas lines.

All the embodiments of the multi-functional lances according to the invention have in common the fact that, as is known per se, electromagnetic waves, in particular in the range of visible light and of the adjacent infrared range, which are emitted by a metal melt, can, through the first tube and/or the first annular gap, be capable of being detected by means of an optical system and of being fed to a detector for determining the temperature and/or chemical composition of the metal melt.

During such measurements, preferably inert gas is blown through the first tube and/or the first annular gap, and, at the same time, the burner function of the multi-functional lance can remain switched on. In this case, the evaluation of the electromagnetic waves for determining the temperature and/or chemical composition of the metal melt may be carried out by pyrometry and/or spectrometry. A similar method has already been proposed in WO 97/22859, the difference being that, here, measurement is not carried out under the bath, as in WO 97/22859.

The multi-functional lances according to the invention, in both the embodiment for smaller solid quantities and that for larger solid quantities, are advantageously arranged in such a way that they are displaceable and/or pivotable along their longitudinal axis. Consequently, on the one hand, the depth of penetration of the respective gas jets into the melt can be controlled and the running distance of the gas jets, in the case of a variable height of the bath surface, can be set, and, on the other hand, a larger region of the bath surface can be reached or swept.

It has proved advantageous, furthermore, to arrange a multi-functional lance below a copper panel bulged in the direction of the interior of the metallurgical vessel, the multi-functional lance remaining displaceable and/or pivotable, since it is thereby protected particularly well.

The number of multi-functional lances used in a metallurgical vessel for the method according to the invention varies with the type of metallurgical vessel and its size and with the embodiments of the multi-functional lances used. One to 10 multi-functional lances may be provided. The investment costs, which are higher in the case of larger numbers, are more than compensated by the fact that the introduction of energy, of carbon and of solids and the post-combustion take place in an essentially equalized manner over the entire furnace space or the entire melt surface and the productivity of the respective metallurgical vessel is increased.

In the case of relatively large numbers of multi-functional lances, for example 5, it is also advantageous for the multi-functional lances to be designed with smaller dimensions, so that the sum of the blowing cross sections is approximately the same as when a smaller number of multi-functional lances, for example only two multi-functional lances, are used.

The electric furnace and the converter are adopted hereafter as typical, but non-restrictive examples for describing the invention.

Unless specified otherwise, the following statements relate to multi-functional lances for blowing in relatively large solid quantities.

In order to simplify the terminology, the first tube, the first, the second, the third and fifth annular gaps and the nozzle tubes, together with the respectively associated mouth part and the outflow ducts, are designated hereafter as nozzle1, nozzle2, nozzle3, nozzle4, nozzle5 and nozzle6.

According to the invention, one or, in the case of larger furnaces, a plurality of multi-functional lances are arranged above the bath surface, as measured before the tapping of the melt, preferably in the side wall, in the bay region or else so as to blast from the furnace roof. The longitudinal axis of the multi-functional lance, if it is arranged in the side wall or in the bay region, is to have an inclination relative to the bath surface of more than 35°. The multi-functional lance is, as a rule, arranged in a stationary manner. In the case of an arrangement in electric furnaces with long bricks in the slag zone or sometimes also in the bay region of the electric furnace, a linearly displaceable lance arrangement, with or without the possibility of pivoting, is provided in the side wall and/or in the bay region or in the furnace roof.

Depending on how the electric furnace is equipped with burners and/or post-combustion lances corresponding to the prior art, the multi-functional lances are used preferably in the area of the colder furnace regions (cold spots) or bay. In principle, however, the multi-functional lances may be used at all points on the furnace circumference or so as to travel down from the furnace roof. In the case of electric furnaces which are charged, for example continuously, with large quantities of sponge iron through a fifth roof hole, it is advantageous to have an arrangement in which the jets from the multi-functional lances impinge in the vicinity of the point of impingement of the sponge iron on the melt, since energy is urgently required there, CO occurs and can be afterburnt and the formation of FeO is reduced by blowing in coal.

As regards the height of the lance position in the side wall, it must be stipulated that the running distance of, for example, the jet from nozzle2 is to be less than 2 m, if the specific refining of the melt and, consequently, the penetration of the oxygen jet into the melt are important. In the bay of the electric furnace, the running distance of the jets is mostly below 1.2 m. In the converter or similar reactors, the running distances of the jets may even be substantially longer than 2 m.

In order to optimize the electrode consumption, the multi-functional lances, when arranged in the side wall, are preferably arranged tangentially to an imaginary cylinder. The cylinder diameter is between the electrode reference circle and the furnace wall.

The multi-functional lance is preferably inserted into an intensively cooled, approximately square copper panel having a side length of about 0.5 m. The lifetime of the surroundings of the lance is thereby lengthened. This is important, in particular, when sometimes large scrap fragments are in use and the preheating time during blasting with oxygen from nozzle4 and fuel from nozzle3 is kept short. Then, in particular, the oxygen jet from nozzle5 or else nozzle2 can be deflected and for a short time a part quantity can brush the panel, as may also occur in conventional burners. Installing the multi-functional lance below a copper panel bulged in a wedge-shaped manner in the direction of the furnace interior has proved particularly advantageous, since the lance is thereby protected particularly well.

Operation with the multi-functional lance according to the invention may be described as follows:

In the stand-by position, the nozzles are loaded with the media, air (nozzle1), air (nozzle2), $N_2$ (nozzle3), air (nozzle4) and air (nozzle5) in minimal quantities which, for example, flow at 0.2 bar.

During charging, the pressure at the nozzles is increased briefly to about 1.5 bar when the lance is exposed to splashes from the furnace space during charging.

After the charging of iron carriers, such as scrap and/or cast iron, and of lump coal, directly reduced iron, slag formers, etc., the multi-functional lance is activated in steps, starting from the keeping-clear quantities (an admission pressure of below 1 bar) and is used for the various purposes. However, the time flow of the method steps also depends, inter alia, on the lumpiness of the feed substances, the planned profile of the carbon content of the melt, the metal oxide contents in the slag, the necessary dephosphorization of the melt, etc. and may vary. In the extreme instance, all the functions are switched on from the outset and the lance is operated constantly for a period of time.

In the case of average feed substances—conventional scrap—, typical operation is as follows:

First, after the ignition of the arc and flaming in the waste-gas elbow, oxygen through nozzle4 is switched on and, immediately thereafter, the fuel, such as, for example, natural gas (0.6 to 7 $Nm^3$/min), from nozzle 3 is connected. The scrap is preheated upstream of the lance (burner function).

After a short time, which depends on the scrap mix used, for example after two minutes, a mean oxygen throughflow from nozzle2 for the cutting and oxidizing melting of the scrap is switched on. Depending on the precalculated $O_2$ quantity for refining, after a metal sump having a depth of, for example, 20 cm has been formed, the melt is decarbonized with a larger quantity of oxygen by means of an oxygen-jet pulse controlled by the first tube. In this case, the burner function remains switched on in most instances of use, in order to optimize the effectiveness of melting and decarbonization and of the partial oxidization of the melt.

After the oxygen from nozzle5 has been connected, the burnable furnace gases are sucked into the individual oxygen jets and partially burnt. The energy released at the same time is transmitted with high efficiency to the scrap, slag and melt and is not lost to the waste-gas system. The latter is even relieved of thermal load. The oxygen jets from nozzle5, that is to say 2 to 16 jets per multi-functional lance, blow askew away from the longitudinal axis of the lance downwards into the scrap running gear.

In a lance for low solid blow-in rates, the central nozzle1 can, if a special change-over valve is installed at the entrance to the nozzle, be changed over from air to the oxygen mode and, after being scavenged with nitrogen, to, for example, the blowing-in of coal. When there is a high demand for oxygen for refining purposes, coal injection is switched off, nozzle1 is scavenged with $N_2$ with the aid of the change-over valve, and nozzle1 and nozzle2 are loaded with a predetermined oxygen throughflow.

The oxygen quantity through nozzle2 is 400 to 3000 $Nm^3$ per hour, depending on the furnace size and the number of multi-functional lances. Up to 0.3 kg/min of coal are blown through the nozzles6 per $mm^2$ of blowing cross section. Depending on the operating mode, therefore, the melt can either be quickly refined or even carbonized. Through a nozzle6 with a nominal width of 12 mm, it is possible, for example, to blow up to 34 kg/min of coal when low $O_2$ quantities are blown through nozzle2. By coal blasting, the slag is foamed very quickly and intensively, the FeO contents in the slags are stabilized at a low level to below 20%, and, even in the case of carbon contents of the melt of, for example, 0.04%, the oxygen contents in the steel are reduced from about 1000 to about 600 ppm. This also leads, inter alia, to lower consumptions of alloying agents and to a purer steel. These effects may be reinforced by scavenging the melt with accurately regulatable scavenging nozzles which are loaded with nitrogen and/or argon plus $CH_4$.

When low carbon contents of the melt of, for example, 0.03% have to be set and the slag must also foam in the superheating period of the melt, the coal is blown onto the slag through nozzle6 only at very low pressure and with a small quantity/min and is thereafter refined again.

When relatively large carbon quantities are to be briefly supplied to the melt or, for conditioning, to the slag, inert gas, air or small oxygen quantities are blown through nozzle2 and large coal quantities through nozzle6. The pressure at the entrance to nozzle6 rises with the blowing-in of coal (or else the blowing-in of solid) according to the following rule of thumb:

$$f = \sqrt{\frac{1.4+B}{1.4}};$$

in this, f represents the factor for the pressure rise in the case of a constant carrier-gas quantity and B represents the carrier-gas content in $kg/Nm^3$.

Particularly in the case of Cr-alloyed melts, the reduction in the CO partial pressure and, consequently, in Cr slagging in the case of carbon contents of, for example, below 1% due to the admixture of inert gas or steam to the oxygen from nozzle1, nozzle2 and nozzle4 is particularly advantageous.

As a result, carbon contents to below 0.4% can be produced efficiently, that is to say with a low degree of slagging of the alloying elements, at low temperature and with high productivity. Subsequent VOD treatment (Vacuum Oxygen Degassing) is thereby shortened appreciably and the entire productivity of the method route EAF, with a multi-functional lance or multi-functional lances and VOD, is increased substantially. Bottom blowing by means of oxygen and inert gas or steam, in combination with the multi-functional lances, is a particularly suitable combination for making alloyed steel, such as, for example, stainless steel, in the EAF, using the present method. In an extreme instance, stainless steel can be made in such an EAF, even without VOD treatment.

The multi-functional lances according to the invention and their use are explained in more detail hereafter in FIG. 1 to FIG. 9 of the drawings.

In this case, FIG. 1 to FIG. 3 of the drawings illustrate the multi-functional lance for blowing in relatively small solid quantities:

BRIEF DESCRIPTION OF THE DRAWINGS

FIG. 4 illustrates a reduced longitudinal section through the entire design of this lance, whilst FIG. 5 illustrates the head of the multi-functional lance.

Figure 5:
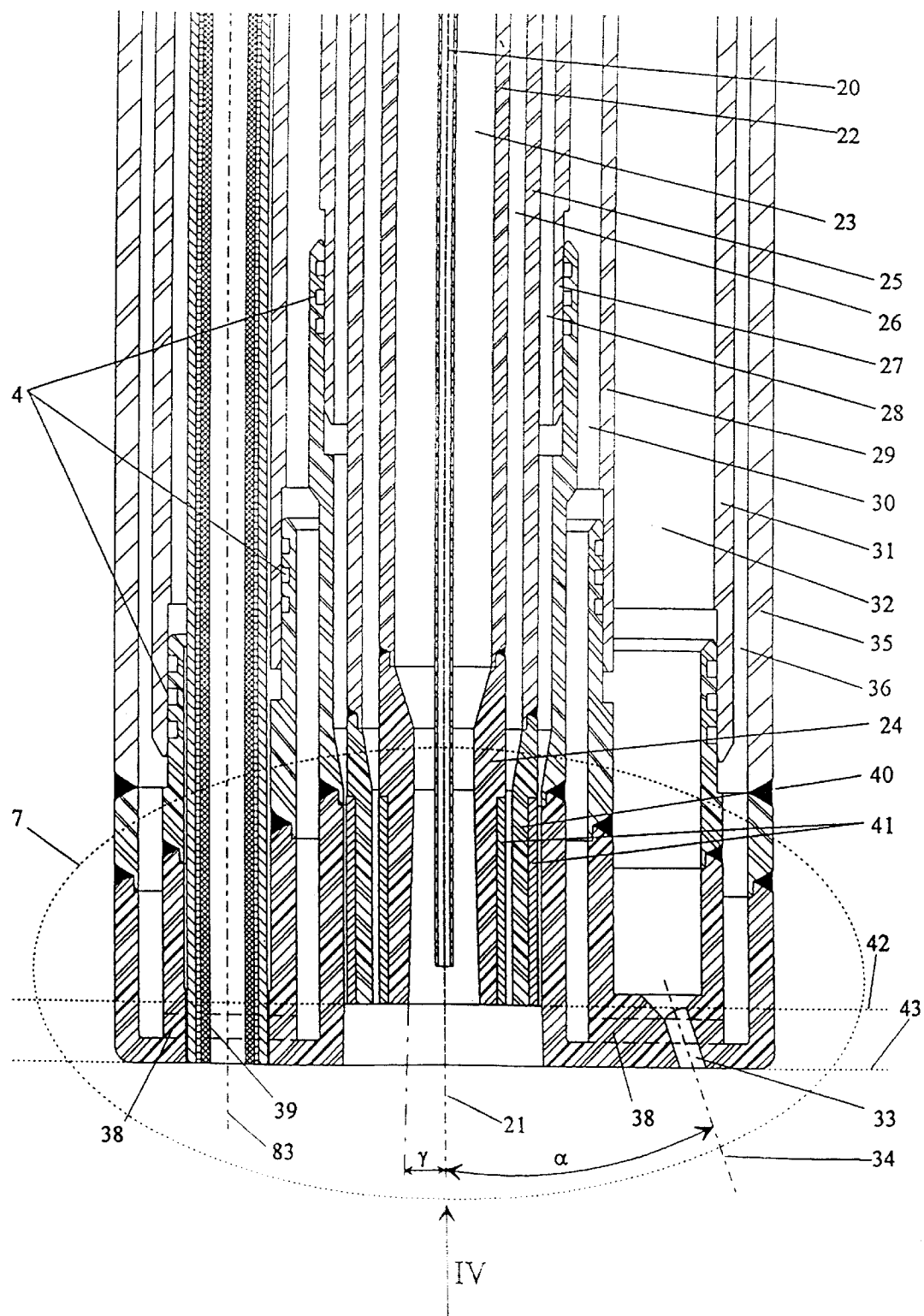
Figure 6:
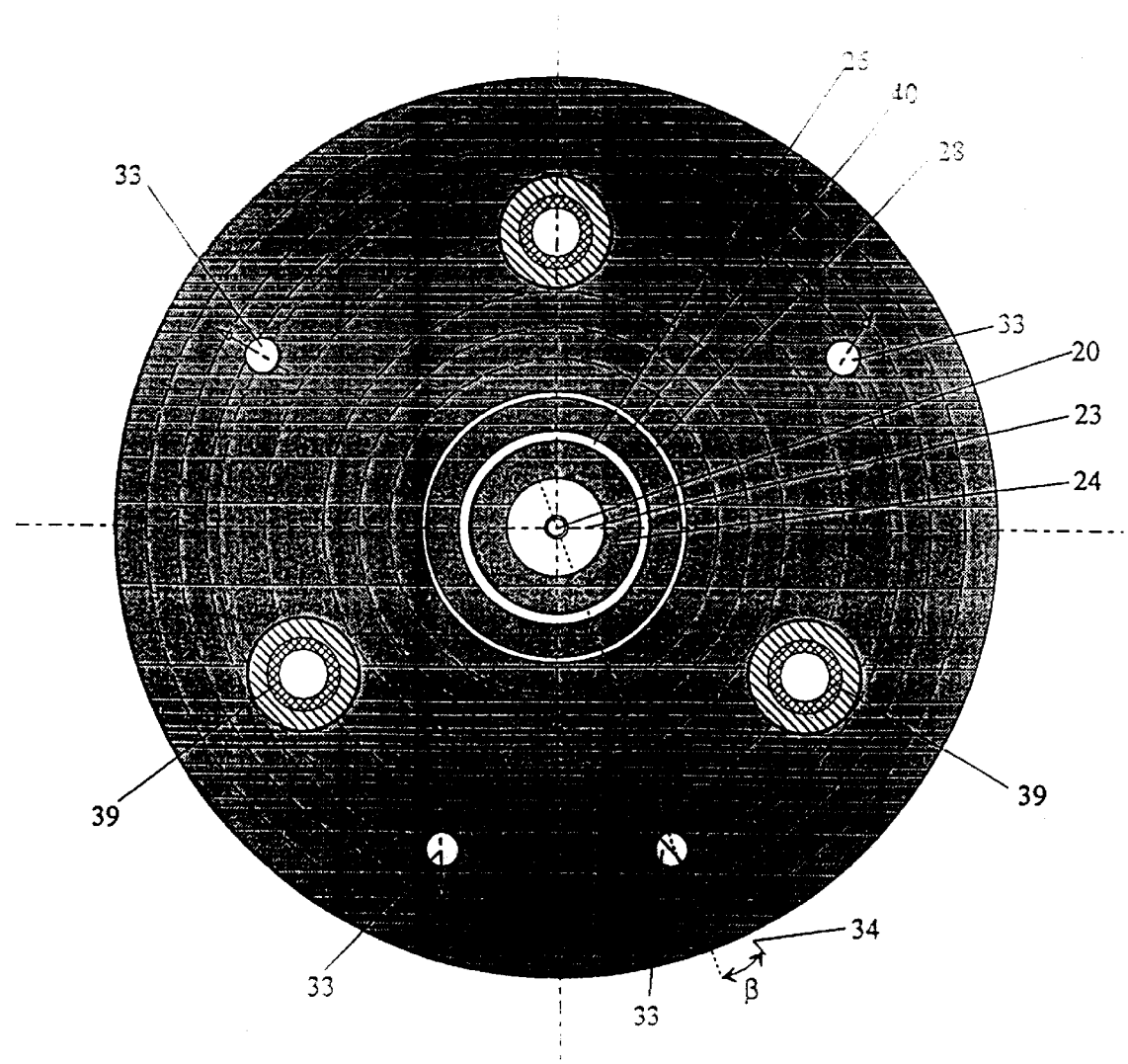

A view of the head illustrated in FIG. 5, in the direction of the arrow IV, can be seen in FIG. 6.

Figure 7:
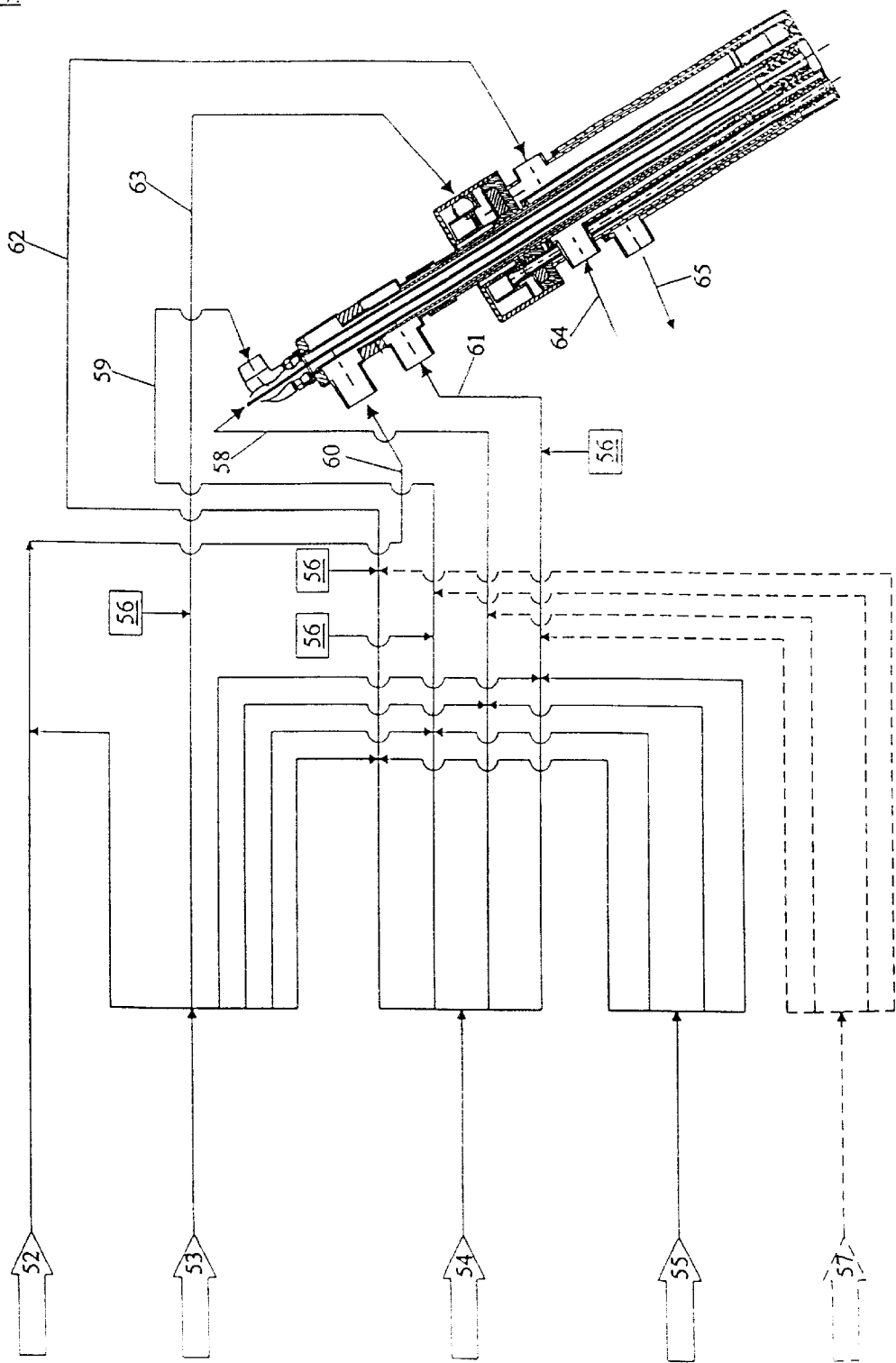

FIG. 7 illustrates the multi-functional lance for relatively large quantities, together with the gas supply lines, FIGS. 8 and 8a and FIGS. 9 and 9a show the installation of multi-functional lances according to the invention into metallurgical vessels.

Figure 1:
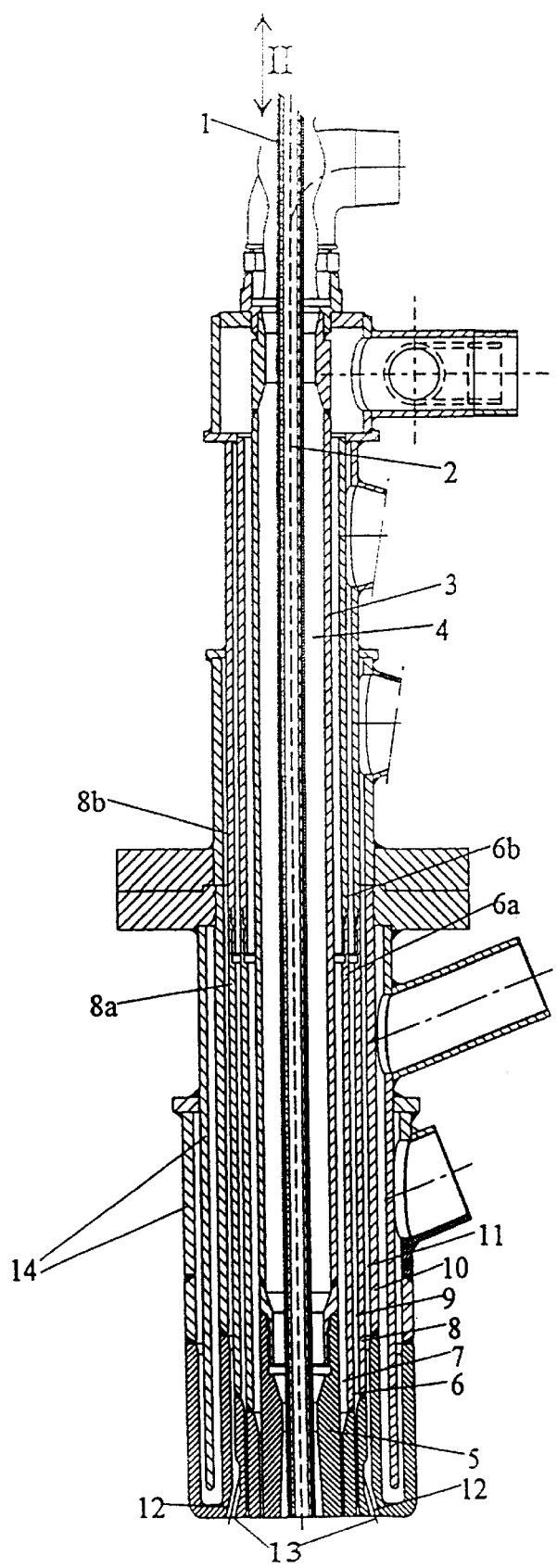
FIG. 1 illustrates a reduced longitudinal section which is drawn through the central longitudinal axis of the multi-functional lance.

The multi-functional lance illustrated in FIG. 1 has a first tube 1 which is used, in particular, for the supply of solid, fine-grained to dust-like substances which can be conveyed pneumatically. This first tube 1 extends in the direction of the central longitudinal axis 2 of the multi-functional lance and is surrounded by a second tube 3, by means of which a first annular gap 4, through which, in particular, oxygen-containing gas is supplied, is formed between the first and second tubes.

The inside of the second tube 3 is designed in the manner of a Laval nozzle at the mouth end which is formed by a specific mouth part 5, easily releasable from the second tube 3 by means of a screw connection, so that the oxygen-containing gas or the oxygen emerges from the mouth part 5 at supersonic velocity.

The second tube 3 is surrounded by a third tube 6, so as to form, between the second and third tubes, a second annular gap 7, through which gaseous and/or liquid fuel is supplied.

A fourth tube 8 surrounds the third tube 6, so as to form, between the third and fourth tubes, a third annular gap 9, through which, once again, in particular, oxygen-containing gas is supplied.

Furthermore, the fourth tube 8 is surrounded by a fifth tube 10, so as to form, between the fourth and fifth tubes, a fourth annular gap 11, through which, in particular, oxygen-containing gas is supplied.

Figure 2:
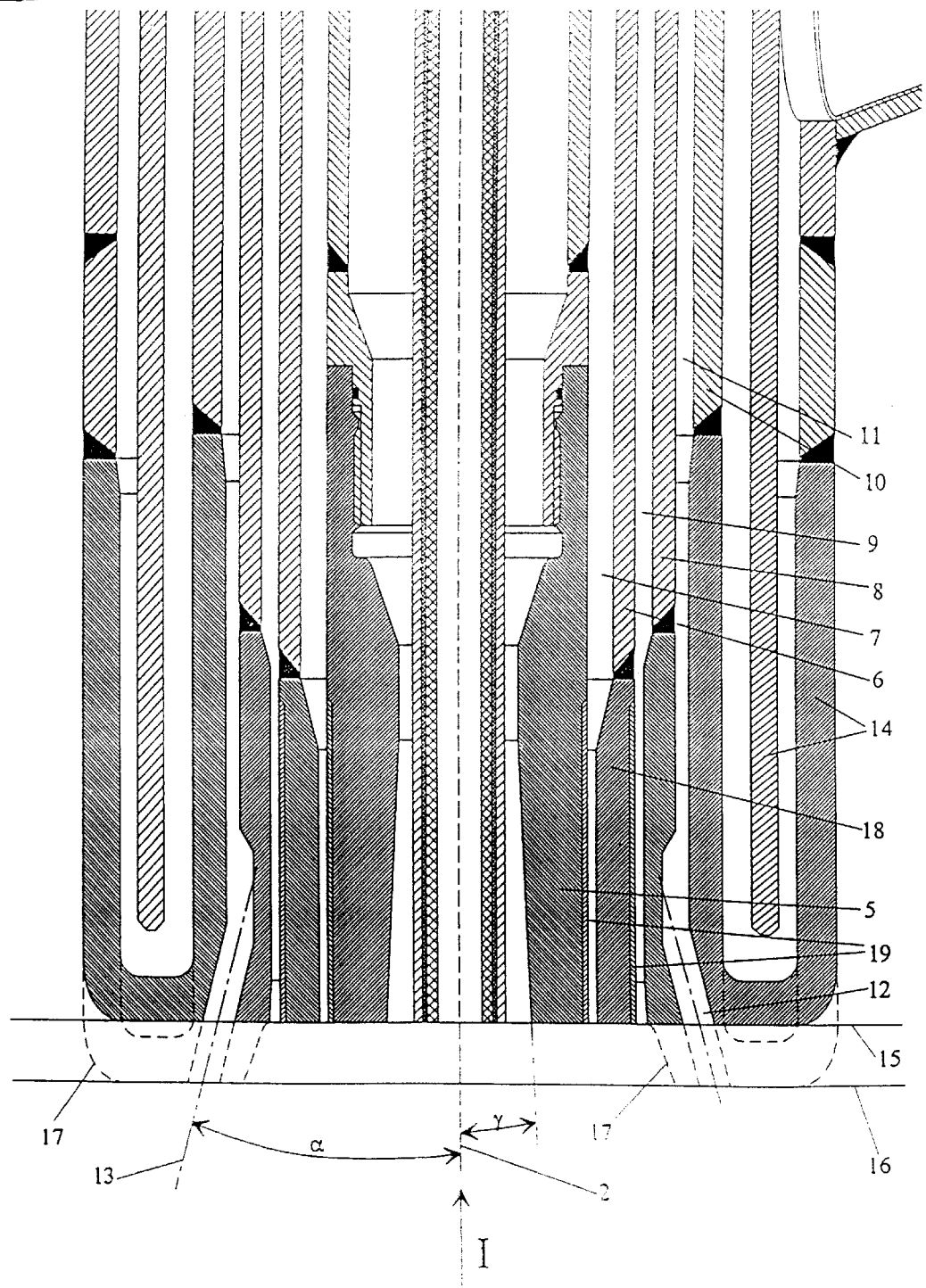
FIG. 2 shows the head of the multi-functional lance.
Figure 3:
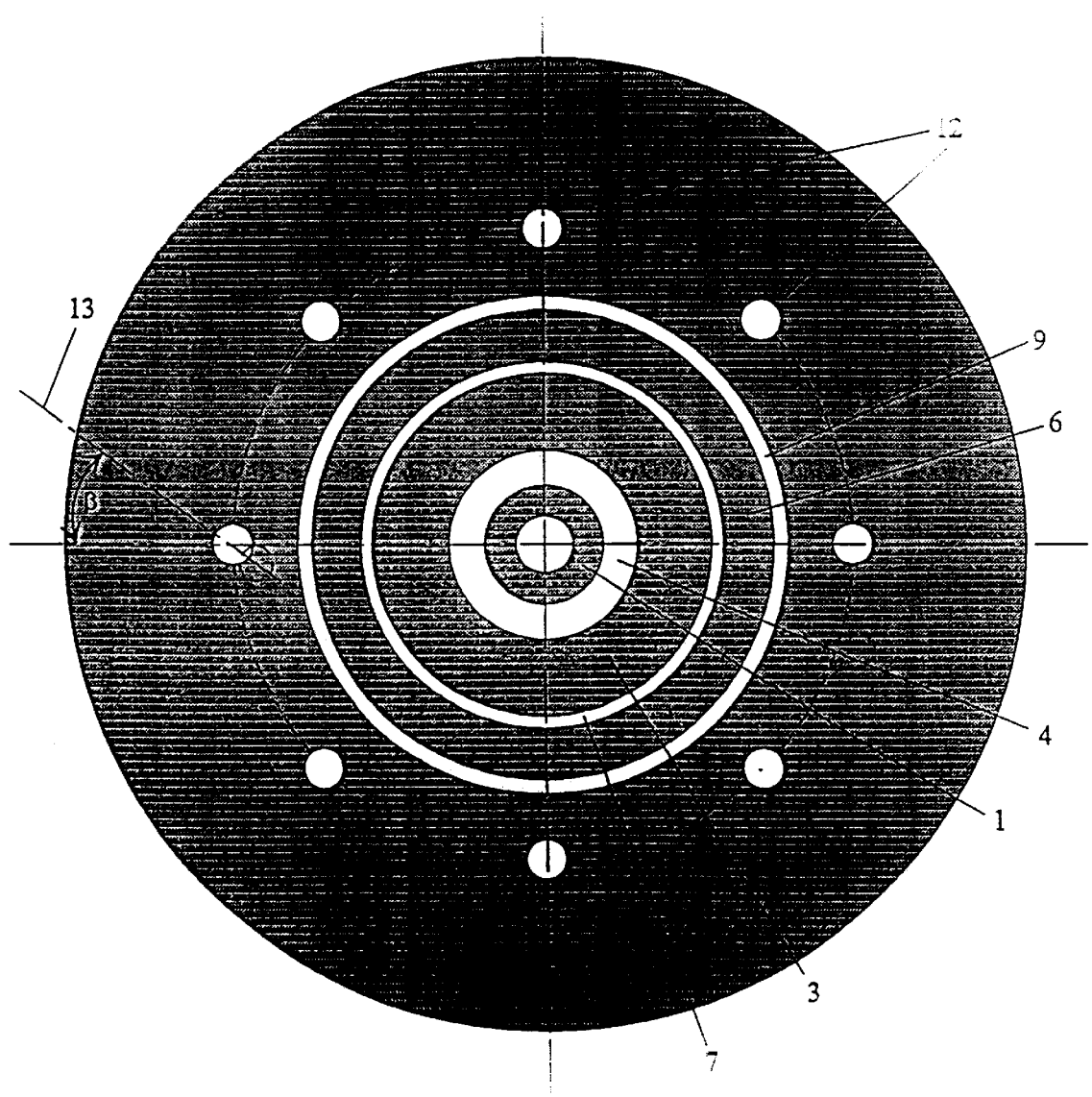
FIG. 3 is a view of the head illustrated in FIG. 2, in the direction of the arrow I of FIG. 2.

The fourth annular gap 11 terminates, on the mouth side, in a plurality of outflow ducts 12. The centre axes 13 of the outflow ducts 12 are skew to the longitudinal axis 2 of the multi-functional lance. The normal projection of the centre axis 13 of each outflow duct 12 onto a plane drawn through the central longitudinal axis 2 and through the mouth of the outflow duct 12 (the said plane being identical to the drawing plane in FIG. 2 of the drawing) forms with the central longitudinal axis 2 an angle α of 2.5 to 25°. As a measure of the skewness, the normal projection of the centre axis 13 of each outflow duct 12 onto a plane directed normally to the central longitudinal axis 2 (this plane being identical to the drawing plane in FIG. 3 and this normal projection coinciding with the centre axis in the selected view of FIG. 3) forms, with a plane drawn through the longitudinal axis 2 and the mouth of the outflow duct, an angle β of 2.5 to 60°.

As a result, the oxygen-containing gas blown in through the outflow ducts 12 and, consequently, also the waste gases from the metallurgical vessel, which are sucked into these oxygen gas jets, are set in a helical mixing movement and the waste gases are sucked into the oxygen gas jets. This leads to efficient intermixing of the oxygen-containing gas and waste gases and to the comprehensive post-combustion of these.

The fifth tube 10 is surrounded on the outside by a water-cooled double casing 14 which conventionally terminates in the same mouth plane 15 as the first, second and third tubes 1, 3, 6 or their mouth parts. The fourth tube 8 and fifth tube 10 may terminate, jointly with the water-cooled double casing 14, in a second mouth plane 16, the first mouth plane being set back (as illustrated by a broken line at 17) behind the second.

The mouth parts 5, 18 of the second 3 and third 6 tube are provided with a plurality of slots 19 on their outside, thereby achieving an intensified cooling effect on the gases supplied through the second 7 and third 9 annular gap.

The first tube 1 is designed to be wear-resistant on the inside. For this purpose, it has a ceramic insert on the inside. The first tube 1 can also be moved along the central longitudinal axis, as indicated by the arrow II, for example by means of a pneumatic drive.

Both the third 6 and the fourth 8 tube are divided in their length and the respective tube parts 6a, 6b and 8a, 8b are fastened to one another by means of screw connections. As a result, the tube parts 6b and 8b can be quickly exchanged in the event of a repair. Sealing-off takes place, for example, by means of an O-ring.

Figure 4:
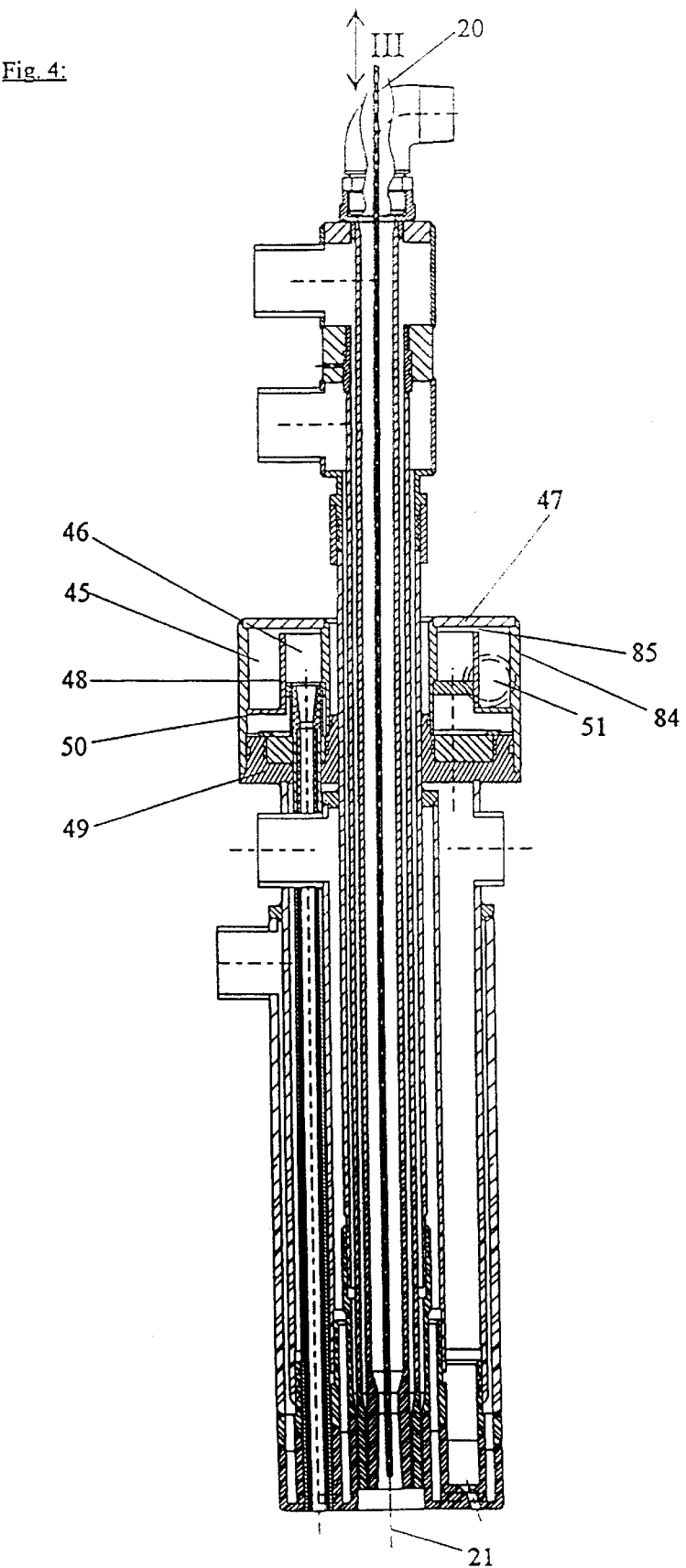
FIGS. 4, 5, 6 and 7 of the drawings illustrate the multi-functional lance according to the invention for blowing in relatively large solid quantities.

The multi-functional lance illustrated in FIG. 4 has a first tube 20 which is used, in particular, for the supply of oxygen-containing gas. This first tube 20 extends in the direction of the central longitudinal axis 21 of the multi-functional lance and is surrounded by a second tube 22, by means of which a first annular gap 23, through which, once again, in particular, oxygen-containing gas is supplied, is formed between the first and second tubes.

When oxygen-containing gas is supplied through the first tube 20, the latter serves mainly for controlling the pulse of the gas jet out of the first annular gap 23 or for controlling the FeO contents of slags. For this purpose, the first tube 20 can be moved along the central longitudinal axis 21, as indicated by the arrow III, for example by means of a pneumatic drive. However, a liquid blow-in step can also be carried out by means of the first tube 20.

The inside of the second tube 22 is designed in the manner of a Laval nozzle at the mouth part 24, so that the oxygen-containing gas or the oxygen emerges from the mouth part 24 at supersonic velocity.

The second tube 22 is surrounded by a third tube 25, so as to form, between the second and third tubes, a second annular gap 26, through which gaseous and/or liquid fuel is supplied.

A fourth tube 27 surrounds the third tube 25, so as to form, between the third and fourth tubes, a third annular gap 28, through which, once again, in particular, oxygen-containing gas is supplied.

Furthermore, the fourth tube 27 is surrounded by a fifth tube 29, so as to form, between the fourth and fifth tubes, a fourth annular gap 30, through which cooling water is supplied.

Furthermore, the fifth tube 29 is surrounded by a sixth tube 31, so as to form, between the fifth and sixth tubes, a fifth annular gap 32, through which, in particular, oxygen-containing gas is supplied.

The fifth annular gap 32 terminates, on the mouth side, in a plurality of outflow ducts 33. The centre axes 34 of the outflow ducts 33 are skew to the longitudinal axis 21 of the multi-functional lance. The normal projection of the centre axis 34 of each outflow duct 33 onto a plane drawn through the central longitudinal axis 21 and through the mouth of the outflow duct 33 (the said plane being identical to the drawing plane in FIG. 5 of the drawing) forms with the central longitudinal axis 21 an angle α of 2.5 to 25°. As a measure of the skewness, the normal projection of the centre axis 34 of each outflow duct 33 onto a plane directed normally to the central longitudinal axis 21 (this plane being identical to the drawing plane in FIG. 6 and this normal projection coinciding with the centre axis in the selected view of FIG. 6) forms, with a plane drawn through the longitudinal axis 21 and the mouth of the outflow duct, an angle β of 2.5 to 60°.

As a result, the oxygen-containing gas blown in through the outflow ducts 33 and, consequently, also the waste gases from the metallurgical vessel, which are sucked into these oxygen gas jets, are set in a helical mixing movement and the waste gases are sucked into the oxygen gas jets. This leads to efficient intermixing of the oxygen-containing gas and waste gases and to the comprehensive post-combustion of these.

The sixth tube 31 is surrounded on the outside by a seventh tube 35, thereby forming a sixth annular gap 36, through which cooling water is drawn off.

The fourth 30 and sixth 36 annular gap are designed to be closed on the mouth side and are connected by means of bores 38 in the head 37 of the multi-functional lance. The fourth 30 and sixth 36 annular gap form, together with the bores 38, a water-cooled double casing, through which approximately 60 m$^3$/hour of water flow during operation.

A plurality of nozzle tubes 39 for the supply of dust-like to fine-grained solids run within the fifth annular gap 32, only one of the nozzle tubes 39 being illustrated in cross section in FIG. 4 and FIG. 5 of the drawings on account of the selected view. The nozzle tubes 39 are designed to be wear-resistant on the inside, for which purpose they are provided with a ceramic insert. The nozzle tubes 39 open out in the head 37 of the multi-functional lance or pierce the said head. The mouths of the nozzle tubes 39 are cylindrical here, but may also be widened slightly conically or be designed in the form of a Laval nozzle.

In special cases, when the use of the outflow ducts 33 for post-combustion is dispensed with, the entire fifth annular gap 32 may additionally be loaded with carrier gas and solid. The solid is then blown through the outflow ducts 33 which are designed to be wear-resistant in this case.

The mouth parts 24, 40 of the second 22 and third 25 tube are provided with a plurality of slots 41 on their outside, as a result of which an intensified cooling effect on the gases supplied through the second 26 and third 28 annular gap is achieved.

The mouth parts of the fourth 27, fifth 29, sixth 31 and seventh 35 tube terminate in a first mouth plane 42. The mouth parts 24, 40 of the second 22 and third 25 tube terminate in a second mouth plane 43, the second mouth plane being set back somewhat behind the first.

Both the fourth 27 and the fifth 29 tube are divided in their length, the fourth tube 27 twice and the fifth tube 29 once, and the respective tube parts are fastened to one another by means of screw connections 44. As a result, the respective tube parts can quickly be exchanged in the event of a repair. Sealing-off takes place, for example, by means of O-rings.

The water-cooled parts of the head 37 of the multi-functional lance, that is to say the mouth parts of the fourth to seventh tube 27, 29, 31, 35, are preferably made from copper, specifically either welded or forged, but preferably cast. After only one weld seam has been severed in each case, these parts can easily be drawn off and therefore replaced.

The nozzle tubes 39 are assigned, approximately in the middle of the multi-functional lance, a solid-distribution chamber 45 which is designed as an annular hollow body and which surrounds the multi-functional lance. Located within the solid-distribution chamber 45 is a further annular hollow body 46 which, however, is designed to be open at the top, with the result that a gap remains between the cover 47 of the solid-distribution chamber 45 and the lateral limitation 48 of the further annular hollow body 46. The nozzle tubes 39 pierce the bottom 49 of the solid-distribution chamber 45 and open into the bottom 50 of the further hollow body 46. A solid supply 51 opens into the solid-distribution chamber 55 approximately tangentially to the latter. Blown-in solids are distributed in the solid-distribution chamber 45 and flow via the lateral limitation 48 of the further hollow body 46, the said limitation forming a kind of overflow, first into the further hollow body 46 and then into the nozzle tubes 39.

FIG. 7 of the drawing illustrates the gas and solid supply system of a multi-functional lance (for relatively large solid quantities).

A fuel supply 52, a carrier-gas supply 53, an oxygen supply 54, an air supply 55, one or more solid supplies 56 and, for special instances of use, a steam supply 57 are provided for supplying all the gases and solids necessary for all the instances of use.

Hydrocarbons, such as methane, ethane, propane or butane, CO or mixtures of these gases, are mostly used as fuel, but, depending on availability, it may also be appropriate to use liquid fuels, for example fuel oil, in which case it is advantageous, particularly in the case of high-viscosity oils, if the respective fuel is preheated before it is used.

Inert gases, such as nitrogen, argon or mixtures of these gases, are typically used as carrier gas. Depending on the instance of use, however, other gases, for example air or natural gas, may also be employed as carrier gas.

The first tube 20 and the first 23, second 26, third 28 and fifth 32 annular gap are provided with gas feed lines 58, 59, 60, 61, 62, the second annular gap 26 being connected to the fuel supply 52 and the carrier-gas supply 53, and the remaining annular gaps 23, 28, 32 as well as the first tube 20 being in each case connected both to the carrier-gas 53, oxygen 54 and air 55 supply and, for special instances of use, to the steam supply 57.

For the coal and solid blow-in functions of the multi-functional lance according to the invention, the carrier-gas feedline 63 to the solid-distribution chamber 45 and, for special cases, the gas feedlines 59, 61, 62 to the first, third and fifth annular gap are in each case provided with solid supplies 56 which can in each case be connected and disconnected to the effect of comprehensive functional versatility.

The main quantity of solids, here, once again, mainly coal, is blown via the nozzle tubes 39. However, in exceptional cases, further quantities of solids may also be blown at any time via one or more of the annular gaps 23, 28 and 32, in which case the respective carrier gas for solid blowing may be oxygen, air, steam or mixtures of these gases.

Furthermore, the multi-functional lance, or the fourth 30 and the sixth 36 annular gap, are equipped with a cooling-water inflow 64 and a cooling-water outflow 65. Water cooling itself may be dispensed with in many instances of use. Thus, in certain cases, this is also possible in the electric furnace, if there is no obligation to maintain the outstanding durability of the lance head.

Figure 8:
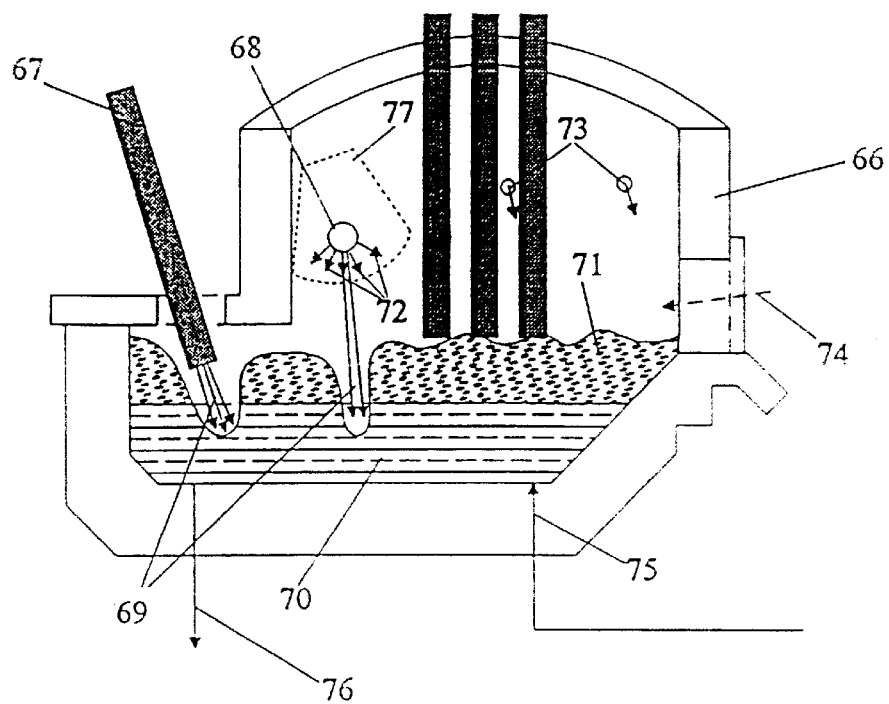

FIG. 8 shows a vertical section through an electric furnace 66, in which multi-functional lances 67, 68 according to the invention are arranged. Furthermore, the penetration of the jets 69 into the melt 70 or the slag 71, and the oxygen jets (short arrows 72) for the post-combustion of the furnace waste gases, are illustrated. Moreover, conventional burner/post-combustion lances 75, as well as a door burner 74 and bottom scavenging nozzles 75, are arranged in the electric furnace 66, and a tapping point 76 is provided. The multi-functional lances 68 are protected by a panel 77 curved forwards towards the furnace interior.

Figure 8A:
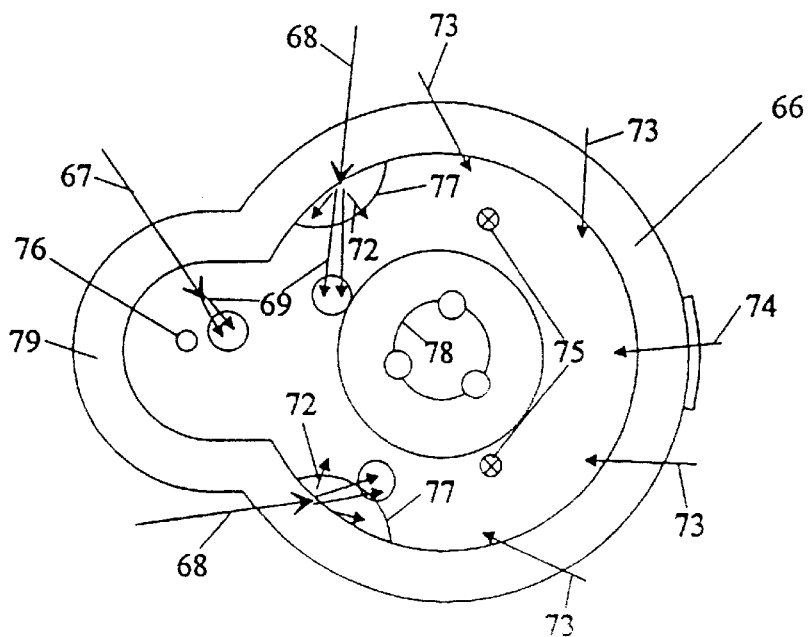

FIG. 8a illustrates a horizontal section through the electric furnace 66 from FIG. 8. The multi-functional lances 68 are arranged approximately tangentially to a circle which is concentric to the electrode reference circle 78. This prevents excessive electrode consumption or premature wear. The further multi-functional lance 67 is arranged in the bay 79 of the electric furnace 66.

Figure 9:
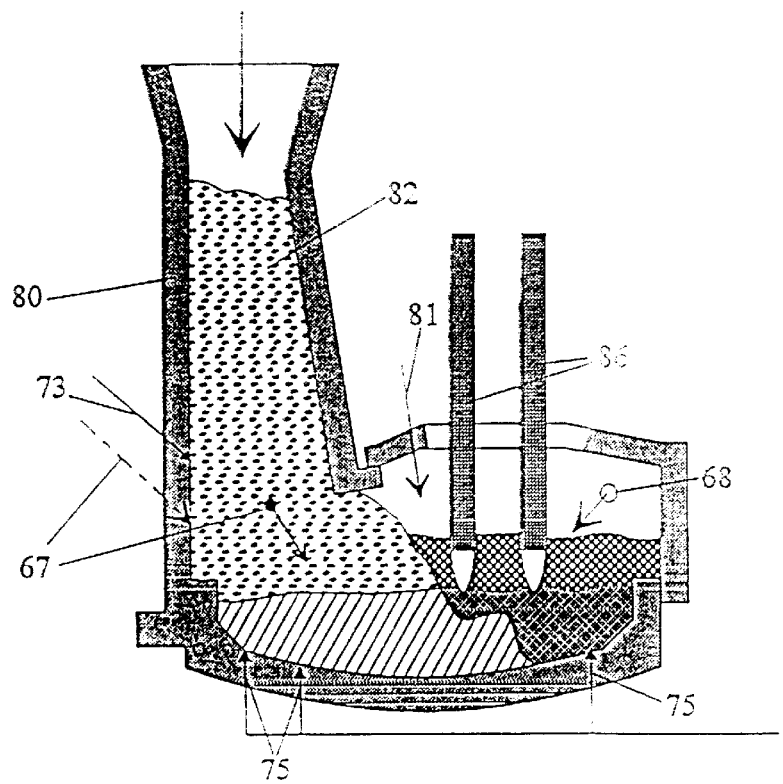
Figure 9A:
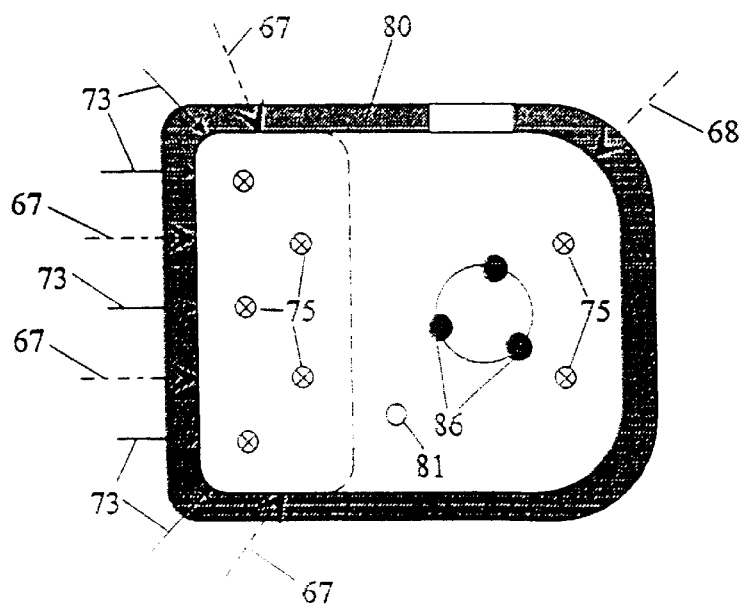

FIG. 9 and FIG. 9a illustrate the arrangement of the multi-functional lances 67, 68 in an electric furnace 80 with an excentric shaft, the burner/post-combustion lances 73 and bottom nozzles 75. A further multi-functional lance 81 is introduced by means of a lifting gear (not illustrated in the drawing), which stands outside the electric furnace 80, into one or more positions through orifices in the roof into the furnace interior for blasting purposes. In this type of furnace, it is particularly important for the preheated and partly already pasty scrap 82 to move in the direction of the electrodes 86 without the formation of skull.

This is achieved in a particularly impressive way by means of the nozzle arrangement illustrated. It was possible to lower the tapping times to below 40 minutes and the current consumption to below 290 kWh/t of liquid steel. The multi-functional lance introduced through the furnace roof also contributed to this.

PRACTICAL EXAMPLES

The designations, nozzle1, nozzle2, nozzle3, nozzle4, nozzle5 and nozzle6 for the first tube, the first, second, third and fifth annular gaps and the nozzle tubes or their respective mouth parts are used again in the following examples.

Example 1

In a 115-t electric furnace with a transformer power of 80 MVA, 3 multi-functional lances (49 and 50), as illustrated in FIGS. 5 and 5a, were installed. The furnace was also equipped with 2 bottom scavenging nozzles and 4 post-combustion/burner lances 55 as well as a door burner 57.

After the charging of the first scrap basket with 49 t of scrap, 19 t of solid pig iron and 1000 kg of lumpy coal onto a metal sump of approximately 20 t, nozzle1, nozzle2, nozzle4 and nozzles being operated with air during charging, nozzle3 and nozzle4 were loaded with 6 Nm$^3$ of O$_2$/min (nozzle4) and 3 Nm$^3$ of CH$_4$/min (nozzle3). After 2 minutes, nozzle2 and nozzle5 were changed over from air to oxygen and loaded with 6 (nozzle2) and 4.5 Nm$^3$/min respectively. Air, in each case with 5 kg/min of fine-grained coal, was blown through nozzle6, in order to accelerate the melting of the scrap and control scrap oxidation. 5 minutes after power-on, that is to say after an increase in the quantity of melted metal, the oxygen quantity of nozzle2 was increased to 16 Nm$^3$/min and the conveyance of coal through nozzle1 doubled to 12 kg/min. Towards the end of the melting-down operation for the first basket, the oxygen quantity through nozzle5 was decreased again.

57 t of scrap were charged in the second basket, and, by means of the multi-functional and post-combustion lances, the same procedure, such as the preheating, cutting, accelerated melting and post-combustion of the furnace waste gases, was carried out, and intensive refining was carried out by means of the oxygen jets of nozzles5 from the 3 multi-functional lances. The two bottom nozzles 57 were operated respectively at 0.4 Nm$^3$ of N$_2$/min and 0.2 Nm$^3$ of CH$_4$/min, which were premixed in the gas-regulating station, although only at half the rates during the two flat bath periods. The oxygen quantities through all the post-combustion lances 55 were adapted to the waste-gas analysis, so that the CO content did not rise above about 10% in the waste gas.

The blowing-in of coal was set, inter alia, according to the requirement for the formation of foamed slag and for a carbon content in the melt of approximately 1580° C. and approximately 0.30% respectively. During a period of 3 minutes, the coal was replaced by a granulated shredderlight fraction. The foaming of the slag also functioned by this means. In the superheating period, refining was carried out with up to altogether 4500 Nm$^3$ of O$_2$/hour. Meanwhile, the post-combustion nozzles (nozzles5) of the multi-functional lances 49 and 50 and the burner 55 were kept clear by air. 2 minutes before tapping and after slagging-off, coal was blown intensively, once again, with a minimal refining effect, in order to lower the oxygen content of the melt to about 600 ppm.

At 0.3% C. in the melt (melt-down), the FeO content in the slag was 18% and the yield of liquid steel was therefore also high at 92%. The tapping follow-up time and the melting capacity were around 52 min. and above 132 t/h respectively. Consumptions amounted to 39 kg of lime/t, 2.1 kg of electrodes/t, 9 kg of lumpy coal/t, 12 kg of blow-in coal/t, 55 Nm$^3$ of O$_2$/t, 4 Nm$^3$ of CH$_4$/t and 290 kWh/t of liquid steel. The multi-functional lances used in this case had a durability of 800 batches. Only the nozzles for blowing in the coal were exchanged once as a precaution.

Example 2

In the production of a melt alloyed with chromium in a 60-t electric furnace, it was possible to lower the carbon content of the melt from 0.8 to 0.3% with the aid of 3 smaller multi-functional lances. The Cr$_2$O$_3$ content of the slag could be kept below 12% by blasting with 40% O$_2$ and 60% N$_2$ in the last third of the refining period. In these tests, 3 scavenging nozzles, which were operated with N$_2$+CH$_4$, were used in the bottom of the electric furnace. By means of this refining period with the multi-functional lances, subsequent VOD treatment could be shortened by 30 min/batch. The slag was foamed by blowing in slag formers. For this purpose, however, the blown-in solid quantity had to be increased to altogether 90 kg/min. The final carbon content was 0.03%.

Example 3

In the melting-down of 80% DRI and 20% scrap, one multi-functional lance was mounted in the tapping region of the furnace bay and 2 multi-functional lances were mounted so as to be capable of being moved through the roof of the furnace into the furnace interior. These two lances blew in the direction of the point of impingement of the DRI's conveyed continuously into the furnace. This bath region was also intermixed more effectively by means of 2 scavenging nozzles which were installed into the bottom of the furnace and which blew with N$_2$+CH$_4$. The main advantage was a reduction in the tapping time in this 150-t electric furnace from 105 to 83 minutes. Productivity was increased by 20%.

Example 4

In a 65-t converter bottom-blowing with oxygen and lime dust, a multi-functional lance was arranged in a stationary manner outside the radius of the converter. 200 Nm$^3$ of O$_2$/min were blown on through the bottom and up to 105 Nm$^3$ of O$_2$/min blown on by the multi-functional lance in the main decarbonization period. By means of the 3-minute scrap preheating, the blowing-on of 15 kg of coal/t and the partial post-combustion of the converter waste gases in the converter and heat transmission, it was possible for the scrap rate (in relation to the yield of liquid steel) to be increased from 22 to 27%. It was possible to reduce the number of bottom nozzles, enlarge the distance between the nozzles and increase the durability of the bottom from 700 to 820 batches. It was also particularly important that the metal and slag crusts inside the upper converter cone were reduced to such an extent that they no longer had to be removed by being burnt off or by being broken out in a time-consuming way. The converter availability was thereby increased. Due to the particular feature of the multi-functional lance, the oxygen supply could be shifted from the side nozzle in the converter wall to outside the radius of the converter. The running length of the free jet was increased by 2.4 m, without any adverse effect.

Example 5

It proved particularly advantageous to use the multi-functional lances in a 120-t DC electric furnace, in which the metallic feed stock consisted of 52% liquid pig iron low in trace elements and 48% scrap. However, the pig iron had a phosphorus content of 0.15%. In this electric furnace with a transformer power of 95 MVA, 4 multi-functional lances were installed into the side wall of the furnace. 2 of the 4 lances did not carry out any blowing-in of coal, since liquid pig iron contains sufficient carbon. However, nozzles6 were periodically loaded with lime dust (altogether 100 kg/min), in order to assist phosphorus slagging. This also included the measure of loading nozzles1 of the multi-functional lances with high oxygen pressure (8 bar) in some blasting periods, with the result that the FeO content of the slag increased from 20 to 35%. The result of this was that it was possible to raise the distribution of the phosphorus between the slag and melt from 50 to 90, that is to say dephosphorization was appreciably improved, with the result that a phosphorus content of 0.015% could be set in the finished sample without any loss of time. The slag quantity was 120 kg/t of liquid steel.

The two water-cooled oxygen lances present, which are normally moved into the furnace through the slag door for refining and slag foaming, were removed. The furnace door was opened only for slagging-off, with the result that the entry of cold nitrogen-containing air was substantially reduced. The following operating mode was adopted:

After the charging of the first and only scrap basket, the scrap region below the electrode was melted in 5 minutes, the furnace roof was opened and the liquid pig iron was quickly emptied into this space by means of the pig-iron ladle. Until this interruption in the current supply, the multi-functional lances were operated in the burner mode and, before the pig iron was emptied in, in the post-combustion and scrap-cutting modes. After the pig iron had been emptied in, refining was carried out, in each case with 1700 Nm$^3$ of O$_2$/h, at the 4 points where the refining jets of the multi-functional lances impinged onto the melt. Nozzles5 for the post-combustion of the furnace gases blew at a shorter distance away from the longitudinal axis of the multi-functional lance than in furnace operation with 100% scrap feed. The heat released during post-combustion was thereby transmitted with higher efficiency to the slag and melt.

The result was a lowering of current consumption from 225 to 190 kWh/t of liquid steel, a shortening of the tapping follow-up time by 10% and a lowering of the nitrogen contents in the finished steel from 58 to 49 ppm on average. In this use, too, the durability of the multi-functional lances is much higher than that of the water-cooled refining lances.

The invention is not restricted to the exemplary embodiments illustrated in the drawings and the examples, but also embraces all the means, known to the average person skilled in the art, which may be employed for implementing the invention.

Thus, it is within the scope of the invention to combine the various possibilities, which allow the multi-functional lances and their operating modes, in different embodiments and also to adapt these possibilities to the operating conditions of other reactors for the production of a wide variety of melts, for example of ferro-alloys with low carbon contents.

What is claimed is:

1. A method for producing a metal melt in a metallurgical vessel, wherein feed substances which contain metals and/or metal oxides are charged in solid and/or molten form into the metallurgical vessel, the main part of the energy necessary for the melting and/or the finish-reduction of the feed substances is applied electrically and/or by the combustion and/or the gasification of carbon-containing materials, comprising the steps of:
A) supplying additional energy to the feed substances by the blowing-in, by means of one or more multi-functional lances, and the combustion of gaseous and/or liquid carbon-containing materials and oxygen-containing gas;
B) cutting and partially melting the solid feed substances by the intensified blowing-in of oxygen-containing gas by means of the multi-functional lance;
C) refining the melted feed substances by the intensified blowing-in of oxygen-containing gas by means of the multi-functional lance;
D) alloying carbon and/or supplying additional energy to the feed substances by the blowing-in and/or burning of fine-grained and/or dust or powder-type solid carbon-containing materials by means of the multi-functional lance;
E) after-burning, in a post-combustion step, waste gases from the metallurgical vessel by the blowing-in of oxygen-containing gas into the waste-gas space of the metallurgical vessel by means of the multi-functional lance, wherein the jet of the oxygen-containing gas from each multi-functional lance is skewed to the central longitudinal axis of the respective multi-functional lance and is set in a helical rotational movement;
F) supplying necessary substances to the feed substances by the blowing-in of fine-grained, dust, and/or powder-type solid aggregates and/or alloying agents by means of the multi-functional lance, in order to achieve a desired composition of the metal melt;
wherein a performance of each step A) through F) depends on the composition of the feed substances and on the desired composition of the metal melt, selectively in any desired combination, in succession and/or in reverse order and/or simultaneously and/or omitting the step D) and/or the step F).

2. The method of claim 1, wherein an electric furnace or a steel converter or a melting-down gasifier or a ladle or a vessel for the conversion of slag is used as a metallurgical vessel.

3. The method of claim 1, wherein one or more multi-functional lances are used jointly with burners, refining lances, post-combustion lances, under-bath nozzles, hollow electrodes, and/or side nozzles.

4. The method of claim 1, wherein one or more of the following substances are blown into or onto the partially or completely melted feed substances: metal ores, metal oxides, nickel oxide, vanadium oxide and chrome oxide, iron carbide, calcium carbide, aluminium, FeSi, FeCr, FeMn, oil-containing scale, slags, slag formers, dusts from dedusting systems, grinding dusts, metal chips, deoxidants, shredderlight fraction, lime, coal, coke and sponge iron, in each case in fine-grained, dust, and/or powder-type form.

5. The method of claim 1, wherein the blowing-in of oxygen-containing gas of step E) takes place in a periodically fluctuating and/or pulsating manner.

6. The method of claim 1, wherein step D) and/or step F) further comprising, in an electric furnace, the jet from a multi-functional lance is directed into the vicinity of a point of impingement or into the point of impingement of solid material, which is charged onto the melt via an orifice in the furnace roof, or of an arc on the melt.

7. The method of claim 1, wherein step D) or step F) further comprising, in a converter, the jet from a multi-functional lance is directed into the vicinity of a point of impingement or into the point of impingement of an oxygen jet from a further lance or a side nozzle on the melt.

8. The method of claim 1, wherein one or more of the steps A), B), D), E), and/or F) are simultaneously performed with a refining step by means of a multi-functional lance.

9. The method of claim 8, wherein a combustion step is simultaneously performed with a refining step by means of a multi-functional lance.

10. The method of claim 1, wherein in a refining step during the production of alloyed iron melts with a low carbon content, steam and/or an inert gas, and/or rare gases are blown into or onto the partially or completely melted feed substances, in addition to the intensified blowing-in of oxygen-containing gas.

11. The method of claim 1, wherein in a carbon blow-in step, during the production of iron melts or steel melts with a low carbon content, the carbon-containing materials are blown at low velocity only onto and into the slag located above the melt.

12. The method of claim 1, wherein during one or more of the steps A), B), C), or E), the following step is performed:
G) blowing-in and thermally decomposing burnable and/or unburnable liquids by means of the multi-functional lance.

13. The method of claim 12, wherein step G) is performed during a refining step, or the liquid jet is directed onto a point of impingement of an arc on the melt.

14. The method of claim 1, wherein during the refining step C), the blown-in jet of the oxygen-containing gas is influenced in a controlled manner by the blowing-in of a further gas jet.

15. A multi-functional lance for use in a method for producing a metal melt in a metallurgical vessel, comprising:
a plurality of tubes which surround one another and are concentric to a central longitudinal axis and a common end of which forms the head of the multi-functional lance;
a first tube for forming a supply duct for solid, fine-grained, dust, and/or powder-type substances;
a second tube surrounding the first tube so as to form a first annular gap for the supply of an oxygen-containing gas, wherein the mouth part of the second tube being designed as a Laval nozzle;
a third tube surrounding the second tube so as to form a second annular gap for the supply of gaseous and/or liquid fuel;
a fourth tube surrounding the third tube so as to form a third annular gap for the supply of an oxygen-containing gas;
a fifth tube surrounding the fourth tube so as to form a fourth annular gap for the supply of an oxygen-containing gas, wherein the fourth annular gap terminates on the mouth side, so as to form a plurality of outflow ducts, wherein the centre axis of each outflow duct is skew to the central longitudinal axis so that the oxygen-containing gas is set in a helical rotational movement.

16. The multi-functional lance of claim 15, wherein the outside of the fifth tube is provided with a water-cooled casing.

17. The multi-functional lance of claim 15, wherein the mouth parts of the first tube, the second tube, and the third tube each terminate in a first mouth plane that is normal to the central longitudinal axis and the mouth parts of the fourth tube and the fifth tube each terminate in a second mouth plane that is normal to the central longitudinal axis, wherein the first mouth plane is set back behind the second.

18. The multi-functional lance of claim 17, wherein the first tube and/or the second tube is manufactured from either an alloyed steel with chromium carbides, a hard-chrome-plated steel, a hard-chrome-plated copper, copper, or a steel which is provided with a ceramic insert or covering on the inside and/or on the outside of the tube.

19. The multi-functional lance of claim 15, wherein the third tube and the fourth tube are divided by length and the respective tube parts are fastened to one another by means of releasable connections.

20. The multi-functional lance of claim 15, wherein the mouth of the first tube, the third tube, the fourth tube, and/or the outflow ducts is a Laval nozzle.

21. The multi-functional lance of claim 15, wherein the first tube, the first annular gap, the second annular gap, the third annular gap, and the fourth annular gap are connected to a carrier-gas supply.

22. The multi-functional lance of claim 15, wherein the first tube, the first annular gap, the third annular gap, and the fourth annular gap are each connected to an oxygen supply, an air supply, and/or a steam supply, wherein the solid injections of each are connectable and disconnectable.

23. The multi-functional lance of claim 15, wherein a change-over can be made from the carrier-gas supply and solid supply of the first tube to the supply of oxygen by means of a change-over device.

24. A multi-functional lance for use in a method for producing a metal melt in a metallurgical vessel comprising:
a plurality of tubes which surround one another and are concentric to a central longitudinal axis and a common end of which forms the head of the multi-functional lance;
a first tube for forming a supply duct for liquids or oxygen-containing gas;
a second tube surrounding the first tube so as to form a first annular gap for the supply of an oxygen-containing gas, wherein the mouth part of the second tube is a Laval nozzle;
a third tube surrounding the second tube so as to form a second annular gap for the supply of gaseous and/or liquid fuel;
a fourth tube surrounding the third tube so as to form a third annular gap for the supply of an oxygen-containing gas;
a fifth tube surrounding the fourth tube so as to form a fourth annular gap for the supply of cooling water, wherein the fourth annular gap is closed on the mouth side;
a sixth tube surrounding the fifth tube so as to form a fifth annular gap for the supply of oxygen-containing gas, wherein the fifth annular gap terminates on the mouth side, so as to form a plurality of outflow ducts, and the centre axis of each outflow duct is skew to the central longitudinal axis, so that the oxygen-containing gas is set in a helical rotational movement;
a seventh tube surrounding the sixth tube so as to form a sixth annular gap for drawing off cooling water, wherein the sixth annular gap is closed on the mouth side, and the fourth annular gap is connected to the sixth annular gap, in the region of the head of the multi-functional lance, by means of bores which do not cross the outflow ducts;
one to nine nozzle tubes of wear-resistant design for the supply of solid, fine-grained, dust, and/or powder-type substances, wherein the nozzle tubes arranged within the fifth annular gap and the centre axis of each nozzle tube are parallel to the longitudinal axis, and the nozzle tubes pierce the head of the multi-functional lance, without crossing bores or outflow ducts.

25. The multi-functional lance of claim 24, wherein the mouth parts of the second tube and of the third tube terminate in a first mouth plane that is normal to the central longitudinal axis and the mouth parts of the fourth tube, the fifth tube, the sixth tube, and the seventh tube terminate in a second mouth plane that is normal to the central longitudinal axis, wherein the first mouth plane is set back behind the second.

26. The multi-functional lance of claim 24, wherein at least one of the third tube, the fourth tube, the fifth tube, the sixth tube, and/or and the seventh tube is divided at least once by length, and the respective tube parts are fastened to one another by screw connections and/or sliding connections that are sealed off by means of O-rings.

27. The multi-functional lance of claim 24, wherein the mouth of the third tube, the fourth tube, the outflow ducts, and/or the one to nine nozzle tubes is a Laval nozzle and/or the mouth of the first tube is widened in diameter.

28. The multi-functional lance of claim 24, wherein the one to nine nozzle tubes is manufactured from either an alloyed steel with chromium carbides, a hard-chrome-plated steel, a hard-chrome-plated copper, or a steel which is provided with a ceramic insert or covering on the inside and/or on the outside of the tube.

29. The multi-functional lance of claim 24, wherein a solid-distribution chamber is assigned to the one to nine nozzle tubes at an end which faces away from the head of the multi-functional lance, wherein the solid-distribution chamber comprises a first annular, essentially cylindrical hollow body that is enclosed and has a bottom, a cover, and a lateral limitation; the one to nine nozzle tubes pierce the bottom of the solid-distribution chamber from below; and at least one solid supply tangentially opens into the lateral limitation of the solid-distribution chamber.

30. The multi-functional lance of claim 29, further comprising a second annular, essentially cylindrical hollow body, wherein the hollow body is open at the top and has a bottom and a lateral limitation, and is located within the solid-distribution chamber in such a way that a gap remains between the cover of the solid-distribution chamber and the lateral limitation of the second hollow body, and the one to nine nozzle tubes open into the bottom of the second hollow body.

31. The multi-functional lance of claim 24, wherein the solid-distribution chamber is connected via a carrier-gas feedline to a carrier-gas supply and to one or more solid supplies.

32. The multi-functional lance of claim 24, wherein the one to nine nozzle tubes is connected to a carrier-gas supply and to a solid supply.

33. The multi-functional lance of claim 24, wherein the first tube, the first annular gap, the second annular gap, the third annular gap, and the fifth annular gap are each connected to a carrier-gas supply.

34. The multi-functional lance of claim 24, wherein the first tube, the first annular gap, the third annular gap, and the fifth annular gap are each connected to an oxygen supply, an air supply and/or a steam supply.

35. The multi-functional lance of claim 15, wherein two to sixteen outflow ducts are provided.

36. The multi-functional lance of claim 15, wherein the normal projection of the centre axis of each outflow duct onto a plane drawn through the central longitudinal axis and through the mouth of the outflow duct forms with the central longitudinal axis an angle $\alpha$ of 2.5° to 25°.

37. The multi-functional lance of claim 15, wherein the normal projection of the centre axis of each outflow duct onto a plane directed normally to the central longitudinal axis forms, with a plane drawn through the central longitudinal axis and through the mouth of the outflow duct, an angle $\beta$ of 2.5° to 60°.

38. The multi-functional lance of claim 15, wherein the aperture angle $\gamma$ of the conical part of the mouth of the second tube is 0.1° to 5°.

39. The multi-functional lance of claim 15, wherein the mouth parts of the second tube and/or third tube have slots on the outside of the tube and these slots are arranged parallel to the central longitudinal axis.

40. The multi-functional lance of claim 15, wherein the first tube is movable within the second tube along the central longitudinal axis.

41. The multi-functional lance of claim 15, wherein the mouth part of the second tube is releasably connected to the second tube.

42. The multi-functional lance of claim 15, wherein the second annular gap is connected to a fuel supply for the supply of liquid and/or gaseous fuel.

43. The multi-functional lance of claim 15, the supply of gases to the multi-functional lance is set by means of simple rigid diaphragms and/or quick-acting stop valves which are arranged in the individual gas lines.

44. The multi-functional lance of claim 15, wherein electromagnetic waves in the range of visible light to infrared are emitted by a metal melt and are detectable through the first tube and/or the first annular gap by means of an optical system and are fed to a detector for determining the temperature and/or chemical composition of the metal melt.

45. The multi-functional lance of claim 15, wherein the multi-functional lance is stationary, displaceable along its longitudinal axis, and/or pivotable.

46. The multi-functional lance of claim 15, wherein the multi-functional lance is arranged below a copper panel bulged in the direction of the interior of the metallurgical vessel.

47. The multi-functional lance of claim 15, wherein one to ten multi-functional lances are provided.

* * * * *